United States Patent
Marlin et al.

(10) Patent No.: US 11,625,647 B2
(45) Date of Patent: Apr. 11, 2023

(54) METHODS AND SYSTEMS FOR FACILITATING ANALYSIS OF A MODEL

(71) Applicants: Todd Marlin, Park City, UT (US); Marisa Marlin, Park City, UT (US)

(72) Inventors: Todd Marlin, Park City, UT (US); Marisa Marlin, Park City, UT (US)

(*) Notice: Subject to any disclaimer, the term of this patent is extended or adjusted under 35 U.S.C. 154(b) by 0 days.

(21) Appl. No.: 17/169,147

(22) Filed: Feb. 5, 2021

(65) Prior Publication Data

US 2021/0158221 A1    May 27, 2021

Related U.S. Application Data

(63) Continuation-in-part of application No. 16/522,502, filed on Jul. 25, 2019, now Pat. No. 11,520,922.

(60) Provisional application No. 62/970,553, filed on Feb. 5, 2020, provisional application No. 62/676,782, filed on May 25, 2018.

(51) Int. Cl.
  *G06N 20/00* (2019.01)
  *G06F 11/07* (2006.01)

(52) U.S. Cl.
  CPC ........... *G06N 20/00* (2019.01); *G06F 11/079* (2013.01)

(58) Field of Classification Search
  None
  See application file for complete search history.

(56) References Cited

U.S. PATENT DOCUMENTS

| | | | |
|---|---|---|---|
| 7,080,057 B2 | 7/2006 | Scarborough et al. | |
| 10,375,187 B1 | 7/2019 | Marlin et al. | |
| 11,068,797 B2 * | 7/2021 | Bhide | G06N 20/00 |
| 2008/0228698 A1 | 9/2008 | Kenedy et al. | |
| 2014/0365506 A1 | 12/2014 | Gong et al. | |
| 2017/0330058 A1 | 11/2017 | Silberman et al. | |
| 2019/0230091 A1 | 7/2019 | Marlin et al. | |
| 2021/0049428 A1 * | 2/2021 | Huang | G06K 9/6262 |

(Continued)

FOREIGN PATENT DOCUMENTS

WO    WO2019139595 A1    7/2019

OTHER PUBLICATIONS

Zhang, Lu, Yongkai Wu, and Xintao Wu. "A causal framework for discovering and removing direct and indirect discrimination." arXiv preprint arXiv:1611.07509 (2016). (Year: 2016).*

(Continued)

*Primary Examiner* — Vincent Gonzales

(57) ABSTRACT

Disclosed herein is a method for facilitating analysis of a model. Accordingly, the method may include receiving, using a communication device, a model data associated with a model from a user device, assessing, using a processing device, the model data, identifying, using the processing device, a field associated with the model based on the assessing, analyzing, using the processing device, the field based on the identifying of the field, identifying, using the processing device, a related field associated with the field based on the analyzing of the field, analyzing, using the processing device, the related field based on the model, generating, using the processing device, a notification based on the analyzing of the related field, transmitting, using the communication device, the notification to the user device, and storing, using a storage device, the model data and the model.

16 Claims, 19 Drawing Sheets

(56) References Cited

U.S. PATENT DOCUMENTS

2021/0056569 A1* 2/2021 Silberman ............ G06Q 10/067
2021/0174222 A1* 6/2021 Dodwell ............... G06F 16/285

OTHER PUBLICATIONS

V. Cerf, and R. Kahn, "A Protocol for Packet Network intercommunication", IEEE Transactions Communications, vol. Com-22, No. 5, May 1974, pp. 637-648. (Year: 1974).*

Sebastian Arnold, Robert Dziuba, and Alexander Loser. 2016. TASTY: Interactive Entity Linking As-YouType. In Proceedings of COLING 2016, the 26th International Conference on Computational Linguistics: System Demonstrations, pp. 111-115. (Year: 2016).*

Bellamy, Rachel KE, et al. "AI Fairness 360: An extensible toolkit for detecting, understanding, and mitigating unwanted algorithmic bias." arXiv preprint arXiv:1810.01943 (2018). (Year: 2018).*

Bantilan, Niels. "Themis-ml: A fairness-aware machine learning interface for end-to-end discrimination discovery and mitigation." Journal of Technology in Human Services 36.1 (2018): 15-30. (Year: 2018).*

Agarwal, Fair AI: How to Detect and Remove Bias from Financial Services AI Models, Extra, Sep. 11, 2019.

Lee et al, Algorithmic bias detection and mitigation: Best practices and policies to reduce consumer harms, Brookings, May 22, 2019.

Manyika et al, What Do We Do About the Biases in AI?, Oct. 25, 2019.

* cited by examiner

METHODS AND SYSTEMS FOR FACILITATING ANALYSIS OF A MODEL

The current application claims a priority to a U.S. provisional application Ser. No. 62/970,553 filed on Feb. 5, 2020.

FIELD OF THE INVENTION

Generally, the present disclosure relates to the field of data processing. More specifically, the present disclosure relates to methods and systems for facilitating analysis of a model.

BACKGROUND OF THE INVENTION

In recent times, Artificial Intelligence (AI) systems and machine learning algorithms are being implemented by both private and public sectors to automate simple and complex decision-making processes. Further, the machine learning algorithms are affecting people in a range of tasks, from making movie recommendations to helping banks determine the creditworthiness of individuals.

However, some algorithms of machine learning algorithms run the risk of replicating and even amplifying human biases, particularly those affecting the protected groups.

Machine learning and artificial intelligence are marching toward being a part of every aspect of our life. Further, models are created by humans and are intended to drive better outcomes and decisions. Depending on their implementation, the models do not merely make suggestions or recommendations but rather execute automated decision making.

Therefore, there is a need for improved methods and systems for facilitating analysis of a model that may overcome one or more of the above-mentioned problems and/or limitations.

SUMMARY OF THE INVENTION

This summary is provided to introduce a selection of concepts in a simplified form, that are further described below in the Detailed Description. This summary is not intended to identify key features or essential features of the claimed subject matter. Nor is this summary intended to be used to limit the claimed subject matter's scope.

Disclosed herein is a method for facilitating analysis of a model, in accordance with some embodiments. Accordingly, the method may include receiving, using a communication device, at least one model data associated with at least one model from at least one user device. Further, the method may include assessing, using a processing device, the at least one model data. Further, the method may include identifying, using the processing device, at least one field associated with the at least one model based on the assessing. Further, the method may include analyzing, using the processing device, the at least one field based on the identifying of the at least one field. Further, the method may include identifying, using the processing device, at least one related field associated with the at least one field based on the analyzing of the at least one field. Further, the at least one field may be associated with the at least one related field through at least one relationship. Further, the method may include analyzing, using the processing device, the at least one related field based on the at least one model. Further, the method may include generating, using the processing device, a notification based on the analyzing of the at least one related field. Further, the method may include transmitting, using the communication device, the notification to the at least one user device. Further, the method may include storing, using a storage device, the at least one model data and the at least one model.

Further disclosed herein is a system for facilitating analysis of a model, in accordance with some embodiments. Accordingly, the system may include a communication device configured for receiving at least one model data associated with at least one model from at least one user device. Further, the communication device may be configured for transmitting a notification to the at least one user device. Further, the system may include a processing device communicatively coupled with the communication device. Further, the processing device may be configured for assessing the at least one model data. Further, the processing device may be configured for identifying at least one field associated with the at least one model based on the assessing. Further, the processing device may be configured for analyzing the at least one field based on the identifying of the at least one field. Further, the processing device may be configured for identifying at least one related field associated with the at least one field based on the analyzing of the at least one field. Further, the at least one field may be associated with the at least one related field through at least one relationship. Further, the processing device may be configured for analyzing the at least one related field based on the at least one model. Further, the processing device may be configured for generating the notification based on the analyzing of the at least one related field. Further, the system may include a storage device communicatively coupled with the processing device. Further, the storage device may be configured for storing the at least one model data and the at least one model.

Both the foregoing summary and the following detailed description provide examples and are explanatory only. Accordingly, the foregoing summary and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present disclosure. The drawings contain representations of various trademarks and copyrights owned by the Applicants. In addition, the drawings may contain other marks owned by third parties and are being used for illustrative purposes only. All rights to various trademarks and copyrights represented herein, except those belonging to their respective owners, are vested in and the property of the applicants. The applicants retain and reserve all rights in their trademarks and copyrights included herein, and grant permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure.

DETAIL DESCRIPTIONS OF THE INVENTION

Figure 1:
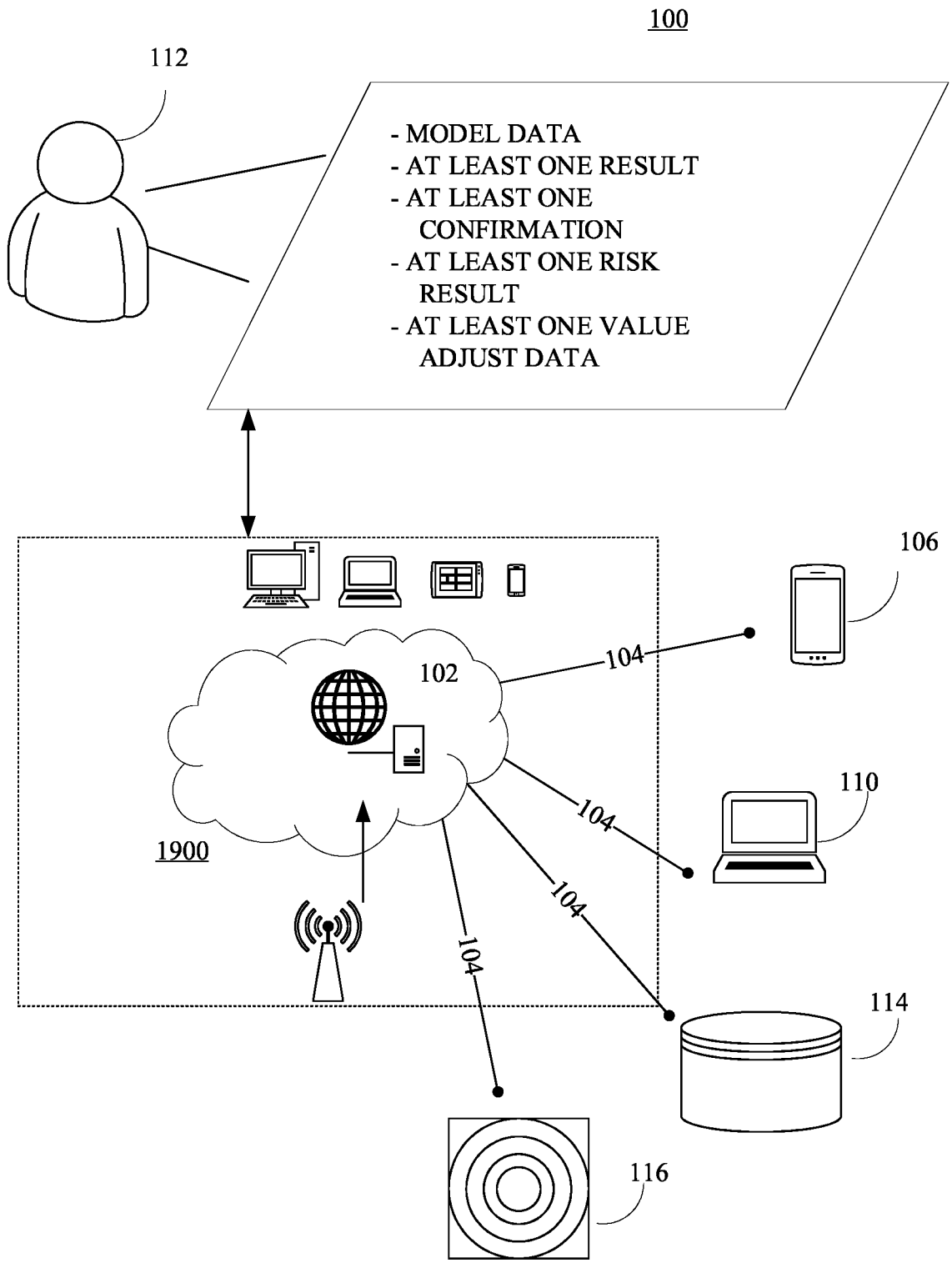
FIG. 1 is an illustration of an online platform consistent with various embodiments of the present disclosure.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure, and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim limitation found herein and/or issuing here from that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present disclosure. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the claims found herein and/or issuing here from. The present disclosure contains headers. It should be understood that these headers are used as references and are not to be construed as limiting upon the subjected matter disclosed under the header.

The present disclosure includes many aspects and features. Moreover, while many aspects and features relate to, and are described in the context of methods and systems for facilitating analysis of a model, embodiments of the present disclosure are not limited to use only in this context.

In general, the method disclosed herein may be performed by one or more computing devices. For example, in some embodiments, the method may be performed by a server computer in communication with one or more client devices over a communication network such as, for example, the Internet. In some other embodiments, the method may be performed by one or more of at least one server computer, at least one client device, at least one network device, at least one sensor and at least one actuator. Examples of the one or more client devices and/or the server computer may include, a desktop computer, a laptop computer, a tablet computer, a personal digital assistant, a portable electronic device, a wearable computer, a smart phone, an Internet of Things (IoT) device, a smart electrical appliance, a video game console, a rack server, a super-computer, a mainframe computer, mini-computer, micro-computer, a storage server, an application server (e.g. a mail server, a web server, a real-time communication server, an FTP server, a virtual server, a proxy server, a DNS server etc.), a quantum computer, and so on. Further, one or more client devices and/or the server computer may be configured for executing a software application such as, for example, but not limited to, an operating system (e.g. Windows, Mac OS, Unix, Linux, Android, etc.) in order to provide a user interface (e.g. GUI, touch-screen based interface, voice based interface, gesture based interface etc.) for use by the one or more users and/or a network interface for communicating with other devices over a communication network. Accordingly, the server computer may include a processing device configured for performing data processing tasks such as, for example, but not limited to, analyzing, identifying, determining, generating, transforming, calculating, computing, compressing, decompressing, encrypting, decrypting, scrambling, splitting, merging, interpolating, extrapolating, redacting, anonymizing, encoding and decoding. Further, the server computer may include a communication device configured for communicating with one or more external devices. The one or more external devices may include, for example, but are not limited to, a client device, a third party database, public database, a private database and so on. Further, the communication device may be configured for communicating with the one or more external devices over one or more communication channels. Further, the one or more communication channels may include a wireless communication channel and/or a wired communication channel. Accordingly, the communication device may be configured for performing one or more of transmitting and receiving of information in electronic form. Further, the server computer may include a storage device configured for performing data storage and/or data retrieval operations. In general, the storage device may be configured for providing reliable storage of digital information. Accordingly, in some embodiments, the storage device may be based on technologies such as, but not limited to, data compression, data backup, data redundancy, deduplication, error correction, data fingerprinting, role based access control, and so on.

Further, one or more steps of the method disclosed herein may be initiated, maintained, controlled and/or terminated based on a control input received from one or more devices operated by one or more users such as, for example, but not limited to, an end user, an admin, a service provider, a service consumer, an agent, a broker and a representative thereof. Further, the user as defined herein may refer to a human, an animal or an artificially intelligent being in any state of existence, unless stated otherwise, elsewhere in the present disclosure. Further, in some embodiments, the one or more users may be required to successfully perform authentication in order for the control input to be effective. In general, a user of the one or more users may perform authentication based on the possession of a secret human readable secret data (e.g. username, password, passphrase, PIN, secret question, secret answer etc.) and/or possession of a machine readable secret data (e.g. encryption key, decryption key, bar codes, etc.) and/or or possession of one or more embodied characteristics unique to the user (e.g. biometric variables such as, but not limited to, fingerprint, palm-print, voice characteristics, behavioral characteristics, facial features, iris pattern, heart rate variability, evoked potentials, brain waves, and so on) and/or possession of a unique device (e.g. a device with a unique physical and/or chemical and/or biological characteristic, a hardware device with a unique serial number, a network device with a unique IP/MAC address, a telephone with a unique phone number, a smartcard with an authentication token stored thereupon, etc.). Accordingly, the one or more steps of the method may include communicating (e.g. transmitting and/or receiving) with one or more sensor devices and/or one or more actuators in order to perform authentication. For example, the one or more steps may include receiving, using the communication device, the secret human readable data from an input device such as, for example, a keyboard, a keypad, a touch-screen, a microphone, a camera and so on. Likewise, the one or more steps may include receiving, using the communication device, the one or more embodied characteristics from one or more biometric sensors.

Further, one or more steps of the method may be automatically initiated, maintained and/or terminated based on one or more predefined conditions. In an instance, the one or more predefined conditions may be based on one or more contextual variables. In general, the one or more contextual variables may represent a condition relevant to the performance of the one or more steps of the method. The one or more contextual variables may include, for example, but are not limited to, location, time, identity of a user associated with a device (e.g. the server computer, a client device etc.) corresponding to the performance of the one or more steps, environmental variables (e.g. temperature, humidity, pressure, wind speed, lighting, sound, etc.) associated with a device corresponding to the performance of the one or more steps, and/or semantic content of data associated with the one or more users. Accordingly, the one or more steps may include communicating with one or more sensors and/or one or more actuators associated with the one or more contextual variables. For example, the one or more sensors may include, but are not limited to, a timing device (e.g. a real-time clock), a location sensor (e.g. a GPS receiver, a GLONASS receiver, an indoor location sensor etc.), a biometric sensor (e.g. a fingerprint sensor), and a device state sensor (e.g. a power sensor, a voltage/current sensor, a switch-state sensor, a usage sensor, etc. associated with the device corresponding to performance of the or more steps).

Further, the one or more steps of the method may be performed one or more number of times. Additionally, the one or more steps may be performed in any order other than as exemplarily disclosed herein, unless explicitly stated otherwise, elsewhere in the present disclosure. Further, two or more steps of the one or more steps may, in some embodiments, be simultaneously performed, at least in part. Further, in some embodiments, there may be one or more time gaps between performance of any two steps of the one or more steps.

Further, in some embodiments, the one or more predefined conditions may be specified by the one or more users. Accordingly, the one or more steps may include receiving, using the communication device, the one or more predefined conditions from one or more and devices operated by the one or more users. Further, the one or more predefined conditions may be stored in the storage device. Alternatively, and/or additionally, in some embodiments, the one or more predefined conditions may be automatically determined, using the processing device, based on historical data corresponding to performance of the one or more steps. For example, the historical data may be collected, using the storage device, from a plurality of instances of performance of the method. Such historical data may include performance actions (e.g. initiating, maintaining, interrupting, terminating, etc.) of the one or more steps and/or the one or more contextual variables associated therewith. Further, machine learning may be performed on the historical data in order to determine the one or more predefined conditions. For instance, machine learning on the historical data may determine a correlation between one or more contextual variables and performance of the one or more steps of the method. Accordingly, the one or more predefined conditions may be generated, using the processing device, based on the correlation.

Further, one or more steps of the method may be performed at one or more spatial locations. For instance, the method may be performed by a plurality of devices interconnected through a communication network. Accordingly, in an example, one or more steps of the method may be performed by a server computer. Similarly, one or more steps of the method may be performed by a client computer. Likewise, one or more steps of the method may be performed by an intermediate entity such as, for example, a proxy server. For instance, one or more steps of the method may be performed in a distributed fashion across the plurality of devices in order to meet one or more objectives. For example, one objective may be to provide load balancing between two or more devices. Another objective may be to restrict a location of one or more of an input data, an output data and any intermediate data therebetween corresponding to one or more steps of the method. For example, in a client-server environment, sensitive data corresponding to a user may not be allowed to be transmitted to the server computer. Accordingly, one or more steps of the method operating on the sensitive data and/or a derivative thereof may be performed at the client device.

Overview:

The present disclosure describes methods and systems for facilitating analysis of a model. The development of artificial intelligence models (or models) can be broken down into two methods. Further, a first method involves the direct use of open source programming languages and libraries (such as Python, R, etc.). Further, a second method includes the use of graphical user interface-driven tools to build and deploy models.

There are many risks related to the development of the models and if the risks are not properly scrutinized; substantial financial, reputational, physical, and emotional harm can occur. The risk of this approach is that individuals who do not understand the implications of various decisions in the model development process can implement incorrect or flawed choices merely by dragging and dropping or by copying code\downloading open source libraries from the internet. The models developed require a deep technical understanding which sets the stage for a potential gap between the stakeholders requesting the models and those implementing them. Further, stakeholders requesting them do not have the means to evaluate and understand how they were implemented, considerations related to the source data, and actual outcomes.

The models can be prone to various types of cyber risks. For example, in the programming method, anyone can publish an open library that allegedly does a certain function with data. However, there are no controls other than the person downloading it, that can check that it does what it is supposed to do.

Data is now widely available and can be downloaded from the internet to combine with your internal data or to use on its own. This can create problems on numerous levels. First, the data may be constructed in a way that it under-represents or over-represents or does not represent critical values. This can be intended for fraud or malicious purposes. Alternatively, it can be that due care was not taken in constructing the set.

Privacy risk can result from using personally identifiable information in a model. Further, the outcome of an incorrectly created model can be that someone's privacy is violated because an unknown personal fact is exposed by an automated decision.

Bias is another significant issue that underpins all of this. Bias is "prejudice in favor of or against one thing, person, or group compared with another, usually in a way considered to be unfair" (Bias, n.d.). Machine learning and artificial intelligence are especially prone to this whether on purpose or by accident. Given the highly technical nature of the skills required coupled with the worldwide shortage of skilled workers, the conditions are ripe for extensive bias in the models. This is coupled with the fact that tools and people do not exist to check them. The market has focused on how can you create and deploy these as quickly as possible. For example, "Thirty-seven percent of organizations have implemented AI in some form. That's a 270% increase over the last four years ("Artificial intelligence has the potential to change business forever", n.d.). By 2021, 80% of emerging technologies will have AI foundations ("Artificial intelligence has the potential to change business forever", n.d.)." (Source: https://cmo.adobe.com/articles/2018/9/15-mind-blowing-stats-about-artificial-intelligence-dmexco.html#gs.vakapg)

Existing systems for evaluating bias rely solely on adjusting input data and measuring the change in the output. Further, existing systems do not fully examine the problem and do not point to the root of the issues nor how to correct them. Bias (Source: https://dictionary.cambridge.org/us/dictionary/english/bias)

The disclosed system may make it easy for the data scientist or analyst to create and save artifacts as they build machine learning models, AI, and similarly linked to each step in the process (including storing the actual models in a database, blockchain, or equivalent). Further, the disclosed system may include a full audit trail. Potential to execute these models from the system as well.

Further, the disclosed system may include a compliance module to enable internal audit, risk management, compliance, and legal to understand the footprint of activity within an organization related to one by reviewing summary reports and dashboards. Further, the compliance module may be configured for drilling down by various methods: geography, business unit, timeframe, employee, etc. Further, the compliance module may be configured for adding coding or additional metadata to enable different groups to review, organize, comment, share, and action. Further, the compliance module may be configured to flag different models based on user-configurable risk indicators (ex, PII, high-risk countries, departments, activities, etc.). Further, the compliance module may be configured to initiate action or request action and to track all steps taken. Further, the compliance module may be configured to set up organization-specific and department-specific workflows.

Further, the disclosed system may include a module that enables the analysis of data and models at every step in the AI/Machine Learning process for wizard or manual driven, fairness, different types of Bias, ethics, etc., organizational, regulatory, and legal risks Further, natural language processing routines may identify potential missing values related to variables or related variables for consideration. Variable Input/Model Output adjustment may look at the impact of changing variable values on the model. Further, the disclosed system may identify potentially underrepresented variables and groupings based on model output. Further, the module may be configured for Routines to determine potentially related variables not included in the source data or data for mode leveraging NLP and dynamic ontologies.

"Bias inherent in any action perception system may include productive bias. Bias may be termed as unfair. Bias may discriminate on the basis of prohibited legal grounds.

Performance in machine learning is achieved via minimization of a cost function. Choosing a cost function and therefore the search space and the possible values of the minimum introduces what we refer to as productive bias into the system. Other sources of productive bias come from the context, purpose, availability of adequate training and test data, optimization method used as well as from trade-offs between speed, accuracy, overfitting and overgeneralizing, each choice associated with a corresponding cost. Thus, the assumption of machine learning being free of bias is a false one, bias being a fundamental property of inductive learning systems. In addition, the training data is also necessarily biased, and it is the function of research design to separate the bias that approximates the pattern in the data we set out to discover vs the bias that is discriminative or just a computational artifact. Bias in Machine Learning is defined as the phenomena of observing results that are systematically prejudiced due to faulty assumptions" (Source: https://towardsdatascience.com/understanding-and-reducing-bias-in-machine-learning-6565e23900ac)

5 Common types of Bias:

1—Sample bias—Happens when the collected data doesn't accurately represent the environment the program is expected to run into. There is no algorithm that can be trained on the entire universe of data, rather than a subset that is carefully chosen. There's a science of choosing this subset that is both large enough and representative enough to mitigate sample bias. Example: Security cameras If your goal is to create a model that can operate security cameras at daytime and nighttime, but train it on nighttime data only. You've introduced sample bias into your model. Sample bias can be reduced or eliminated by training your model on both daytime and nighttime and covering all the cases you expect your model to be exposed to. This can be done by examining the domain of each feature and make sure we have balanced evenly-distributed data covering all of it. Otherwise, you'll be faced by erroneous results and outputs the don't make sense will be produced.

2—Exclusion bias—Happens as a result of excluding some feature(s) from our dataset usually under the umbrella of cleaning our data. We delete some feature(s) thinking that they're irrelevant to our labels/outputs based on pre-existing beliefs. Example: Titanic Survival prediction. In the famous titanic problem where we predict who survived and who didn't. One might disregard the passenger id of the travelers as they might think that it is completely irrelevant to whether they survived or not.

Little did they know that Titanic passengers were assigned rooms according to their passenger id. The smaller the id number the closer their assigned rooms are to the lifeboats which made those people able to get to lifeboats faster than those who were deep in the center of the Titanic. Thus, resulting in a lesser ratio of survival as the id increases. The assumption that the id affects the label is not based on the actual dataset, I'm just formulating an example." (Source: https://towardsdatascience.com/5-types-of-bias-how-to-eliminate-them-in-your-machine-learning-project-75959af9d3a0) Exclusion bias can be reduced or eliminated by investigating before discarding feature(s) by doing sufficient analysis on them. Exclusion bias can be reduced or eliminated by asking a colleague to look into the feature(s) you're considering to discard, afresh pair of eyes will definitely help. (Source: https://towardsdatascience.com/5-types-of-bias-how-to-eliminate-them-in-your-machine-learning-project-75959af9d3a0)

"If you're low on time/resources and need to cut your dataset size by discarding feature(s). Before deleting any, make sure to search the relation between this feature and your label. Most probably you'll find similar solutions, investigate whether they've taken into account similar features and decide then.

Better than that, since humans are subject to bias. There are tools that can help. Take a look at this article (Explaining Feature Importance by example of a Random Forest), containing various ways to calculate feature importance. Ways that contain methods that don't require high computational resources.

3—Observer bias (aka experimenter bias)—The tendency to see what we expect to see, or what we want to see. When a researcher studies a certain group, they usually come to an experiment with prior knowledge and subjective feelings about the group being studied. In other words, they come to the table with conscious or unconscious prejudices.

Example: Is Intelligence influenced by status?—The Burt Affair

One famous example of observer bias is the work of Cyril Burt, a psychologist best known for his work on the heritability of IQ. He thought that children from families with low socioeconomic status (i.e. working-class children) were also more likely to have lower intelligence, compared to children from higher socioeconomic statuses. His allegedly scientific approach to intelligence testing was revolutionary and allegedly proved that children from the working classes were in general, less intelligent. This led to the creation of a two-tier educational system in England in the 1960s that sent middle and upper-class children to elite schools and working-class children to less desirable schools.

Burt's research was later of course debunked and it was concluded he falsified data. It is now accepted that intelligence is not hereditary." (Source: https://towardsdatascience.com/5-types-of-bias-how-to-eliminate-them-in-your-machine-learning-project-75959af9d3a0)

Observer bias can be reduced or eliminated by ensuring that observers (people conducting experiments) are well trained. Observer bias can be reduced or eliminated by Screening observers for potential biases. Observer bias can be reduced or eliminated by having clear rules and procedures in place for the experiment. Observer bias can be reduced or eliminated by making sure behaviors are clearly defined. (Source: https://towardsdatascience.com/5-types-of-bias-how-to-eliminate-them-in-your-machine-learning-project-75959af9d3a0)

4—"Prejudice bias-happens as a result of cultural influences or stereotypes. When things that we don't like in our reality like judging by appearances, social class, status, gender and much more are not fixed in our machine learning model. When this model applies the same stereotyping that exists in real life due to prejudiced data it is fed. Example: A computer vision program that detects people at work If your goal is to detect people at work. Your model has been fed to thousands of training data where men are coding and women are cooking. The algorithm is likely to learn that coders are men and women are chefs. Which is wrong since women can code and men can cook.

The problem here is that the data is consciously or unconsciously reflecting stereotypes.

Prejudice bias can be reduced or eliminated by ignoring the statistical relationship between gender and occupation. Prejudice bias can be reduced or eliminated by exposing the algorithm to a more even-handed distribution of examples.

5—Measurement bias—Systematic value distortion happens when there's an issue with the device used to observe or measure. This kind of bias tends to skew the data in a particular direction.

Example: Shooting images data with a camera that increases the brightness.

This messed up measurement tool failed to replicate the environment on which the model will operate, in other words, it messed up its training data that it no longer represents real data that it will work on when it's launched. This kind of bias can't be avoided simply by collecting more data.

Measurement bias can be reduced or eliminated by having multiple measuring devices. Measurement bias can be reduced or eliminated by hiring humans who are trained to compare the output of these devices." (Source: https://towardsdatascience.com/5-types-of-bias-how-to-eliminate-them-in-your-machine-learning-project-75959af9d3a0)

Further, other types of bias may include.

1—"Group attribution Bias—This type of bias results from when you train a model with data that contains an asymmetric view of a certain group. For example, in a certain sample dataset if the majority of a certain gender would be more successful than the other or if the majority of a certain race makes more than another, your model will be inclined to believe these falsehoods. There is a label bias in these cases. In actuality, these sorts of labels should not make it into a model in the first place. The sample used to understand and analyze the current situation cannot just be used as training data without the appropriate pre-processing to account for any potential unjust bias. Machine learning models are becoming more ingrained in society without the ordinary person even knowing which makes group attribution bias just as likely to punish a person unjustly because the necessary steps were not taken to account for the bias in the training data." (Source: https://www.kdnuggets.com/2019/08/types-bias-machine-learning.html)

2—"Confirmation Bias is the tendency to process information by looking for, or interpreting, information that is consistent with one's existing beliefs." (Source: https://www.britannica.com/science/confirmation-bias). "This is a well-known bias that has been studied in the field of psychology and directly applicable to how it can affect a machine learning process. If the people of intended use have a pre-existing hypothesis that they would like to confirm with machine learning (there are probably simple ways to do it depending on the context) the people involved in the modeling process might be inclined to intentionally manipulate the process towards finding that answer. I would personally think it is more common than we think just because heuristically, many of us in industry might be pressured to get a certain answer before even starting the process than just looking to see what the data is actually saying." (Source: https://www.kdnuggets.com/2019/08/types-bias-machine-learning.html)

3—"Reporting Bias occurs when the frequency of events, properties, and/or outcomes captured in a data set does not accurately reflect their real-world frequency. This bias can arise because people tend to focus on documenting circumstances that are unusual or especially memorable, assuming that the ordinary can "go without saying."

4-Automation Bias is a tendency to favor results generated by automated systems over those generated by non-automated systems, irrespective of the error rates of each.

EXAMPLE: Software engineers working for a sprocket manufacturer were eager to deploy the new "groundbreaking" model they trained to identify tooth defects until the factory supervisor pointed out that the model's precision and recall rates were both 15% lower than those of human inspectors.

5—Selection Bias occurs if a data set's examples are chosen in a way that is not reflective of their real-world distribution. Selection bias can take many different forms:

a-Coverage bias: Data is not selected in a representative fashion.

EXAMPLE: A model is trained to predict future sales of a new product based on phone surveys conducted with a sample of consumers who bought the product. Consumers who instead opted to buy a competing product were not surveyed, and as a result, this group of people was not represented in the training data.

b—Non-response bias (or participation bias): Data ends up being unrepresentative due to participation gaps in the data-collection process.

EXAMPLE: A model is trained to predict future sales of a new product based on phone surveys conducted with a sample of consumers who bought the product and with a sample of consumers who bought a competing product. Consumers who bought the competing product were 80% more likely to refuse to complete the survey, and their data were underrepresented in the sample.

C-Sampling bias: Proper randomization is not used during data collection.

EXAMPLE: A model is trained to predict future sales of a new product based on phone surveys conducted with a sample of consumers who bought the product and with a sample of consumers who bought a competing product. Instead of randomly targeting consumers, the surveyor chose the first 200 consumers that responded to an email, who might have been more enthusiastic about the product than average purchasers.

6—Group Attribution Bias is a tendency to generalize what is true of individuals to an entire group to which they belong. Two key manifestations of this bias are In-group bias and Out-group homogeneity bias. Further, the In-group bias is a preference for members of a group to which you also belong, or for characteristics that you also share.

EXAMPLE: Two engineers training a résumé-screening model for software developers are predisposed to believe that applicants who attended the same computer-science academy as they both did are more qualified for the role.

Further, the Out-group homogeneity bias is a tendency to stereotype individual members of a group to which you do not belong, or to see their characteristics as more uniform.

EXAMPLE: Two engineers training a résumé-screening model for software developers are predisposed to believe that all applicants who did not attend a computer-science academy do not have sufficient expertise for the role.

7—Implicit Bias occurs when assumptions are made based on one's own mental models and personal experiences that do not necessarily apply more generally.

EXAMPLE: An engineer training a gesture-recognition model uses a head shake as a feature to indicate a person is communicating the word "no." However, in some regions of the world, ahead shake actually signifies "yes."

A common form of implicit bias is confirmation bias, where model builders unconsciously process data in ways that affirm preexisting beliefs and hypotheses. In some cases, a model builder may actually keep training a model until it produces a result that aligns with their original hypothesis; this is called the experimenter's bias.

EXAMPLE: An engineer is building a model that predicts aggressiveness in dogs based on a variety of features (height, weight, breed, environment). The engineer had an unpleasant encounter with a hyperactive toy poodle as a child, and ever since has associated the breed with aggression. When the trained model predicted most toy poodles to be relatively docile, the engineer retrained the model several more times until it produced a result showing smaller poodles to be more violent." (Source: https://developers.google.com/machine-learning/crash-course/fairness/types-of-bias)

8—Out-group homogeneity bias is a "tendency to see out-group members as more alike than in-group members when comparing attitudes, values, personality traits, and other characteristics. In-group refers to people you interact with regularly; out-group refers to people you do not interact with regularly. If you create a dataset by asking people to provide attributes about out-groups, those attributes may be less nuanced and more stereotyped than attributes that participants list for people in their in-group.

For example, Lilliputians might describe the houses of other Lilliputians in great detail, citing small differences in architectural styles, windows, doors, and sizes. However, the same Lilliputians might simply declare that Brobdingnagians all live in identical houses. Out-group homogeneity bias is a form of group attribution bias." (Source: https://quizlet.com/368628515/types-of-bias-flash-cards/)

Further, the disclosed system may be integrated with at least one assessment models such as Google™ Toolkit AI fairness, IBM™ Toolkit, etc. Further, the disclosed system may be integrated with at least one store model. Further, the at least one store model may include GitHub™, Blockchain, etc. Further, the disclosed system may be configured for auditing a document. Further, the auditing trail associated with the auditing may include document steps taken to build and test models and refine to document fairness. Further, the document may be approved to use data for purpose and source. Further, the document may be visualized using Tableau™, Spotfire™, etc. Further, modeling associated with the disclosed system may be performed on Python, R, Alteryx, RM, etc. Further, a wizard-driven system may be developed to create entries for each model used. Further, the source and purpose of data (such as the document) may be captured. Further, the modeling may include formulating related business process(es). Further, the disclosed system may be configured for testing steps, Exploratory Data Analysis (EDA), building model, displaying results, analysis of bias, changes, etc. Further, the disclosed system may use Natural Language Processing (NLP) to analyze categorical variables (i.e. what is not considered). Further, the disclosed system may use fuzzy matching and near matching to line up NLP results (and human confirmation. Further, the disclosed system may leverage LIME™, FairML™.

Further, in an embodiment, the disclosed system may include an artifact import module. Further, the artifact import module may log all actions. Further, a user may import or link to the artifact in the data science process. Further, the artifact import module may be configured for storing a link to artifacts and/or copy of the artifact version. Further, the artifact import module may capture a date. Further, the artifact may include a user-defined (free text plus configurable fields). Further, the artifact import module may be configured for identifying embedded comments and offers the option to initiate a wizard to utilize comments to explain the purpose of the artifact and how it works.

Further, the disclosed system may be associated with an automatic bias analysis generation system. Further, the automatic bias analysis generation system may use the NLP to analyze topics. Further, the automatic bias analysis generation system may be configured for performing internet research and suggest analysis based on bias types. Further, the automatic bias analysis generation system may be configured for assessing the risk associated with the modeling of the document. Further, the automatic bias analysis generation system may be configured for controlling the analysis of bias considerations. Further, the automatic bias analysis generation system may be configured for the NLP generation of topics for consideration. Further, real-world entities associated with the automatic bias analysis generation system may include geographies, communities, religions, ages, races, countries, etc. Further, the automatic bias analysis generation system may be configured for creating a bias ontology.

Further, in an embodiment, the disclosed system may include a bias and fairness analysis module. Further, the bias and fairness analysis module may log all actions. Further, the user may select a model to analyze and then choose to analyze either source data—all fields or Data to be used in model or Model Output.

Further, upon selecting source data and the data to be used in the model, the bias and fairness analysis module may access source data and identify categorical and continuous variables. Further, the bias and fairness analysis module may identify high-risk fields (ex. race, religion, sex, citizenship, any PII) and then select fields that will likely be or are in the model (i.e. predictor\independent\dependent). Further, the bias and fairness analysis module may identify other fields that may have a relationship to the model fields (ex. ontologies and entity relationships—group related fields—address, income, weight, height, sibling's country associated with the user). Further, for the fields, the bias and fairness analysis module may come up with a unique value list and perform summary statistics unique values, zeros, nulls, blanks. Further, for all categorical fields in a model that are common entity types (such as NLP values), the bias and fairness analysis model may perform a web search to obtain a unique list of values and compare values to those unique values in the data. Further, the bias and fairness analysis module may be configured for identifying matches and non-matches. Further, the bias and fairness analysis module may be configured for receiving human confirmation. Further, for the categorical fields in the model that are common entity types such as ontologies, the bias and fairness analysis module may be configured for receiving variable description and build an ontology of related variables based on internet search/NLP. Further, the bias and fairness analysis module may perform bias analysis for different bias types. Further, the different types of bias analysis include an exclusion bias, prejudice bias, and selection bias. Further, the exclusion bias may determine if the variables to be fed/was fed into the model excludes related fields to the variables selected (height but not weight). Further, the exclusion bias may leverage ontologies to identify variables that are not present in the set. Further, the prejudice bias may determine the representation of gender, race, religion, age, sexuality, country, state, and [produce various automatic visualizations that show these dimensions and identify potential gaps (under-representation). Further, the prejudice bias may produce various visualizations that analyze these variables against other variables in the data. Further, data may not be selected in a representative fashion in the selection bias. Further, the selection bias may use a heat map to highlight categorical variables. Further, the heat maps may represent little coverage of values (Yellow), lack of value (as identified by the NLP process) (Red). Further, the heat maps may represent apparent sufficient coverage (Green). Further, the selection bias may create scatterplots to show coverage of each selected variable by time, geography, or user-selected variables. Further, the scatter plots may save analysis and annotate analysis in the Data Scientist notebook. Further, reporting bias may analyze coverage of the variable values by time dimensions and highlight gaps, and perform internet research to determine typical frequency benchmark and compare to the data.

Further, upon selecting model output, the user may select to use LIME or FairML to adjust values and compare the output. Further, additional bias analysis functions may be offered. Further, the prejudice bias may analyze the impact of gender, race, religion, age, sexuality, country, state, etc., and produce visualizations that analyze model output from these perspectives. Further, the additional bias analysis functions may include detecting fairness. Further, the fairness may analyze categorical values vs results to identify whether different groups are receiving disproportionate results.

Further, in an embodiment, the disclosed system may include a data scientist notebook module configured for logging all actions. Further, the user may select a model to work or create a new model. Further, the data scientist notebook module may allow the posting of sticky notes, tasks for data scientists to make notes to themselves. Further, the data scientist notebook module may allow data scientists to share model artifacts with another data scientist who can comment, sticky notes, ad tasks. A data scientist uses this module to keep track of all artifacts from the process and store them in a logical way that maps to the data science lifecycle. Fairness module activities can be automatically enabled and the artifacts from that process are stored in the notebook. The use of this module creates an entry in the digital library function in the disclosed system for use by the legal & compliance module and use by chief data offices, legal, compliance, and internal audit. Further, the data scientist notebook module has a visual interactive graphic that illustrates each step in the data science process. Further, the data scientist notebook module may link to artifacts in other applications while work is in process. Further, the data scientist notebook module may store each version of the particular artifact in a blockchain or database equivalent. Further, the data scientist notebook module may designate which are the final copies and ensure they can be changed without authorization.

Further, in an embodiment, the disclosed system may include a legal and compliance review module. Further, the legal and compliance review module may log all actions. Further, the legal and compliance review module may provide the user with an interactive dashboard that enables legal, compliance, & internal audit to review model activity. This can be customized by the department and by the user (based on the job). Further, the legal and compliance review module may allow the user to search for models based on a variety of data elements (type, jurisdiction, the involvement of third-party data or models, risk factors, tags, departments, employees, business process, etc.). Further, the legal and compliance review module may allow the user to add notes, add tags, assign to workflow management\case management for legal, compliance, or internal\external audit purposes. Further, the user may send inquiries to individuals and teams and attach work product. Further, the legal and compliance review module may allow the user to generate or perform a review as to what was done to mitigate bias, etc. Further, the legal and compliance review module may allow the user generate reports regarding records affected. Further, the legal and compliance review module may provide the user ability to request reports from teams and individuals (i.e. summary analysis of model impact for a date range). Further, the disclosed system may set up notifications of finalization of models, changes, responses to inquiries, etc. Further, the legal and compliance review module may track all activity. Further, the legal and compliance review module may enable messaging within the disclosed system or via email.

Further, in an embodiment, the disclosed system may include a library module. Further, the library module may allow the user to define organizational structure and departments. Further, the library module may allow the user to import or link to the employee list. Further, the library module may allow the user to track the summary stats of records affected by the date (this would need to be imported through a separate process). Further, the library module may allow the user to view holistic reports of machine models by department, type, business process, other custom tags, etc. Further, the library module may allow the user to customize fields in the library. Further, the library module may allow the user to generate interactive reports of where models are being used. Further, the library module may be configured for generating interactive dashboard reports. Further, the library module may be configured for providing search functionality. Further, the library module may be configured for creating a model summary report that includes key facts about the model. Further, the model summary report may include purpose, data used, history, and bias analysis.

Further, the present disclosure describes an analysis of a model. Further, the analysis may include a bias analysis. Further, the model may include a machine learning model or an artificial intelligence model. Further, the bias analysis may include knowledgebase driven entity type recognition and list generation and Web-Based Entity Type Recognition and List Generation. Further, the bias analysis may be performed using a bais analysis module. Further, the bias analysis module is aimed at identifying bias in datasets associated with the model by comparing the values present in a dataset with a more universal and inclusive set of values for a particular variable. For instance, the module can use a handful of values from a variable capturing the US cities, identify the type of data (i.e. US cities) and provide a more comprehensive set of values for the said variable. This allows identifying bias in data through omission.

Further, an explainability module associated with the disclosed system may be configured for line by line code explanation generation, high-level flow chart generation, and detailed flow chart generation. Further, the explainability module may be configured for code library categorization based on paid libraries, open-source libraries, untrusted libraries, out of date libraries, and library version detection. Further, the explainability module may be configured for high-risk code segment recognition based on a data read/ write, API data access, database data read/write, and hard-coded values. Further, the explainability module may be configured for high-risk entity recognition from datasets based on PII, PHI, and Financial Information. The purpose of the explainability module is to be able to create a more natural way of describing a piece of ML code. This modules not only generates a line by line description of the code in plain English but also links it to the documentation for the functions used. Besides, the explainability module allows its users to identify high-risk sections in the code by analyzing libraries, data input/output, and datasets used in the code. Lastly, the system creates a graphical representation (a flow chart) of the code to tie together all of the above information.

Further, a business compiler associated with the disclosed system may facilitate the classification of code into high-level data science steps. Further, the business compiler may facilitate high-level description generation from code. The business compiler may be an extension of the explainability system and aims to generate a high-level summary of the code for business users. Further, the business compiler partitions the code along with different steps of the Data Science life-cycle and generates a high-level summary for each.

Further, the disclosed system may include a module for model perturbation. Further, the module for the model perturbation may be configured for model perturbation after flipping labels for sensitive groups, model retraining after scaling of numerical features, model retraining after flipping labels for sensitive groups, model retraining after redistribution of sensitive groups, model retraining by user-specified distribution, model retraining after normalization of numerical features. Further, the model perturbation module may observe changes in the output of a model as a function of changes in its input, particularly around sensitive groups. The disclosed system can create side by side comparisons of outputs and decisions before and after the perturbations.

Further, the module for model perturbation may facilitate visualizations. Further, the visualizations may include side by side Feature Importances before and after perturbation, side by side Sankey charts before and after perturbation, side by side Sankey charts before and after redistributing values, side by side confusion matrix before and after perturbation, side by side confusion matrix with distribution treemap before and after perturbation, side by side confusion matrix with Sankey before and after perturbation.

Further, the disclosed system may include I/O Analysis Module configured for visualizations associated with feature importance, feature importance percentage, and categorical distribution. Further, the visualizations may include a distribution tree map per target, correlation matrix, box & whisker plots for numerical variables, and sanky charts for highly correlated variables. Further, the I/O Analysis module performs an analysis of input features and their impact on the outcome/target-variable. The I/O Analysis module creates different visualizations capturing these relations between input and output variables.

Further, the disclosed system may be configured for feature importance analysis using feature importance visualizations and relative and absolute feature importance visualizations. Further, the feature importance analysis may include analysis of feature importance and creates visualizations for a given machine learning model.

Further, the disclosed system may include an EDA and UDM driven visualizations module configured for generating EDA & UDM Visualisations. Further, the EDA & UDM Visualisations may include hierarchical Clustering including sunburst charts for showing the hierarchical clusters. Further, the EDA & UDM Visualisations may include a scatter plot for showing the clustering results in a 2D plane, line chart for showing time-series data (has an adjustable time slider), AUC ROC, word cloud, predicted vs actual chart, cross-correlation chart with adjustable offsets, a simple moving average chart for computing moving averages on time series data, and variable imbalance. Further, the variable imbalance may include pie charts for showing the imbalance between categorical variables. Further, the EDA & UDM Visualisations may be associated with descriptive statistics (ie null, sum, count, missing, duplicate, etc.). Further, the EDA & UDM Visualisations may facilitate the distribution of numeric data (univariate/bivariate/multivariate distribution) and the distribution of categorical data. Further, the EDA & UDM Visualisations may facilitate analyzing time series of numeric data by daily, monthly, and yearly frequencies. Further, the EDA & UDM Visualisations may include a scatter plot of the relationship between each variable. Further, the EDA & UDM Visualisations may facilitate image decomposition & plot. Further, the EDA & UDM Visualisations may include visualization of extracted features-images. Further, the EDA & UDM Visualisations may include visualization of extracted features-text. Further, the EDA & UDM Visualisations may include a network diagram for Topic Modeling exploration with pyLDAvis. Further, the EDA & UDM Visualisations may include heat maps associated with geospatial data. Further, the EDA & UDM Visualisations may include bubble maps associated with the geospatial data. Further, the EDA & UDM Visualisations may be associated with correlation (spatial autocorrelation): Geospatial data. Further, the EDA & UDM Visualisations may include a visualization of sentiment. Further, the EDA & UDM Visualisations may facilitate performing the graphical univariate analysis (e.g., histograms, box plots). Further, the EDA & UDM Visualisations may facilitate performing bivariate Analysis (e.g., scatter plots). Further, the EDA & UDM Visualisations may facilitate performing correlation analysis (significance, sign, and size analysis). Further, the EDA & UDM Visualisations may facilitate performing variable transformations (if needed; e.g., z-score, log, min-max scaling). Further, the EDA & UDM Visualisations may handle missing values (null handling: impute median or mean, make zero, remove records). Further, the EDA & UDM Visualisations may facilitate addressing outlier treatment (include, exclude, variable transformation). Further, the EDA & UDM Visualisations may facilitate performing dimensionality reduction.

Further, the EDA and UDM driven visualizations module may automatically perform EDA through visualizations for a provided dataset. The EDA and UDM driven visualization modules that cover a large breadth of use cases like classification, regression, and time series analysis as well as a variety of data types like time-series, categorical, numerical, text, image, and geo.

Further, the disclosed system may include a data quality scorecard module that may compare datasets based on EDA/Visualisations across the following facets: variable summary, text features, geographic, and time series. Further, the data quality scorecard module may build on top of the EDA of a single dataset and allows for the comparison of a different dataset by scoring them across the facets.

Further, the disclosed system may include an AI/ML decisions and financial impact module configured for AI/ML decisions and financial impact analytics. Further, the AI/ML decisions and financial impact analytics may include logging every decision by an ML Model with information that may include decision Id, decision Time/Date, model name, model version, decision value, dollars associated (e.g. value traded), custom facets, actual value/correct decision, and dollar outcome (e.g. profit/loss on a trade). Further, the AI/ML decisions and financial impact analytics may facilitate visualizing of a number of decisions, the accuracy of decisions, dollars associated, and dollar outcome. Further, the AI/ML decisions and financial impact analytics may facilitate filtering the above across the following: decision Time/Date, model name, and model version. Further, the AI/ML decisions and financial impact module may log the decisions of ML models and their financial impact. The disclosed system provides an easy to use Python library for logging such decision and their financial impact across time and ML model versions.

Further, the disclosed system may include a job management module. Further, the job management module may include a job orchestrator, where a platform may submit jobs. Further, the job orchestrator may allow a dispatcher to dispatch them to the relevant workers. Further, the job management module may save the result once the job is completed. Further, a central orchestrator may fetch the status and response of each job when queried.

Further, the disclosed system may be configured for performing explicit diagnostics that may include bias analysis, chatbot analytics, PII/PHI analysis, and synthetic data. Further, the synthetic data may be associated with testing and generation. Further, the objective of this set of functionality is to a) generate synthetic data and then b) use it to see how a model behaves. Initially, the synthetic data will be based upon an existing data set with specified transformations, eventually, will be able to create from scratch. Further, the generation of the synthetic data is associated with features such as uploading a prototype data set on which to base synthetic data, identifying the variable type (autosuggest), identifying the variable type (manual set/override), selecting variables to make synthetic data, setting the method for synthetic manipulation (e.g., distribution), setting parameters for the synthetic manipulation (e.g., mean, std dev, skew, kurtosis), running the synthetic manipulation to create new data set, and exporting newly created synthetic data set (e.g., to CSV). Further, the testing of the synthetic data may be associated with features such as uploading a model file for evaluation (e.g., pickle file), running original data through the model, running the synthetic data through the model, comparing and contrasting outputs from original and synthetic, printing results of the comparison (i.e., to PDF), and exporting results of the comparison (i.e., to editable format). Further, the create from scratch of the synthetic data may be associated with features such as specifying variable names and types, specifying attributes for desired synthetic values, generating synthetic data set, and exporting newly created synthetic data set (e.g., to CSV).

Further, the disclosed system may be configured for data characterization that may include UDM/EDA and data scorecards. Further, the data scorecards may be Static (canned) and Dynamic Further, the data scorecards are intended to be a mechanism by which a user can accomplish two primary tasks: get a quick summary of a particular data set—how many rows, what fields, etc. Second, using these same metrics, compare two (or more) data sets and see how they are alike and different. Further, the Static (canned) of the data scorecards may be associated with features such as selecting data set to use (Pre-reqs the user asset/file upload/ management), generating Basic Statistics (Row Count, etc.), identifying the variable type (autosuggest) (i.e., the variables (fields) in the data file), identifying the variable type (manual set/override), generating calculated Statistics—Categorical (value+counts/etc.), generating Calculated Statistics—Numerical (mean/median/std dev/etc.), generating Calculated Statistics—Other, selecting a second data set to compare to first, viewing results of the comparison, printing results of the comparison (i.e., to PDF), and exporting results of the comparison (i.e., to CSV or other editable formats). Further, the Dynamic of the data scorecards may be associated with features such as selecting which statistics to include in the report, selecting which statistics to include in the comparison, re-ordering selected statistics, and removing statistics. Further, Universal Data Models (UDM) and Early Data Assessment (EDA) is intended to provide a variety of mechanisms to explore and understand data sets. These can function stand-alone (i.e., serve as an exhibit in a notebook) or feed into other analyses. Further, Setting of the UDM/ EDA is associated with features such as selecting UDM elements available in a framework or in-service model (Scorecards) (which analysis in what context), uploading data set, connecting to the data set, and selecting data source from existing data sources. Further, Generation of the UDM/ EDA is associated with features such as selecting analysis to generate and where to output and comprising an ability to have version control for analysis generated multiple times. Further, Interactivity of the UDM/EDA is associated with features such as comprising an ability to select data field or fields for use in analysis, comprising an ability to assign element or elements in analysis inputs or outputs for follow up or sharing or messaging, comprising an ability to select element or elements in input or outputs of analysis and associate with toolbar action (ex. risk, finding, etc) and comprising an ability to assign an analysis or element as a report artifact.

Further, the disclosed system may include model understanding & explainability. Further, the model understanding and explainability may be performed based on feature analysis/importance, model perturbation, model explainability, decision explainability (lime), RPA explainability, AI decision/impact analytics, Responsible Technology Labels. Further, the Responsible Technology Labels may be static and dynamic Further, the Responsible Technology (RT) labels are intended to allow a viewer (e.g., customer, regulator) to quickly understand what steps have been taken to ensure that particular use of adv tech is fair, unbiased, and socially responsible, etc. Further, the Static of the Responsible Technology Labels is associated with features such as selecting label contents (which measures do you include), mapping label contents to notebook elements (i.e how does a label element align to a framework), defining label element as Qualitative or Quantitative, defining element settings (i.e how calculated or where text pulled from), exporting label at a point in time, and creating label export log. Further, the Dynamic of the Responsible Technology Labels is associated with features such as configuring where a label is dynamically generated (ie file share, the image on the website) and setting up an ability to dynamically refresh the label (website, file share, etc.). Further, Model explainability is intended to provide a collection of analyses and metrics to help understand how a model makes decisions at the aggregate level (as opposed to explaining individual decisions). Further, Setup&Execute of the Model explainability is associated with features such as uploading model file to analyze, uploading data set for use in analysis, connecting to data set for use in analysis, parsing data set and model file to identify fields and data types, selecting fields for input parameters to a model, selecting field as training output for the model, and running analysis (batch). Further, Use results in other areas of the Model explainability are associated with features such as selecting elements from analysis outputs to add to a notebook, properly formatting elements for export, and flagging elements for sharing or review (workflow). Further, the Decision Explainability (LIME) is intended to help a user to understand how a particular decision was made. Further, the RPA Explainability is intended to help a user understand how RPA bots are functioning within their organization, what decisions they are making, and what risks they may be incurring.

Further, the disclosed system may be associated with infrastructure/Common that may include notebook/Main UX. Further, the notebook/Main UX may be basic/Lite or robust. Further, the infrastructure/Common may include Workflow/Frameworks that may be case-specific and library/customizable. Further, the infrastructure/Common may include a desktop widget. Further, the infrastructure/Common may include Client/User Management that may include tenant management, user management, authentication (stand-alone), authentication (integrated), and billing. Further, the infrastructure/Common may include reporting. Further, the reporting may be static (canned), customizable, and dynamic. Further, the reporting may include export to PDF, export to Editable (e.g., Word), and Natural Language Generation. Further, the infrastructure/Common may include Client Data Management. Further, the Client Data Management may include file upload & storage. Further, the Client Data Management may include connecting to other data sources. Further, the Client Data Management may be associated with enhanced File Library/Persistence. Further, the Client Data Management may include streaming (in/out), export (analysis outputs), artifact Upload & Mgmt, and artifact Viewing & Editing. Further, the infrastructure/Common may include status and Metrics that may be associated with internal dashboards. Further, the infrastructure/Common may include integration. Further, the integration may include collaboration and third party hooks/API. Further, the disclosed system may be associated with initial clients/channels.

Further, the disclosed system may enable Data Scientists to store documentation and utilize tools to enhance models. Further, the disclosed system may also enable Data Scientists to store documentation and utilize tools to enhance models. Further, the disclosed system may perform a Bias Analysis. Further, the disclosed system may allow a user to select LIME or FairML to adjust values. Further, the disclosed system may compare outputs of the values and stores actual models in a blockchain. Further, the disclosed system may enable a Legal and Compliance or an Auditor to examine AI risk at a high level and then probe specific areas. Further, the disclosed system may generate an audit trail. Further, the disclosed system may include a Review Module (Decisions). Further, the review model may generate a sample (random, etc.) and present the user with inputs to make manual decisions. Further, the disclosed system may include a Survey to enable a country specific (ex. Canada, EU) or custom surveys on AI usage, etc. Further, the disclosed system may include a Bias Module. Further, the Bais Module may include an ability to compare values in a field to values in a KB and then search the internet if necessary to identify a) potential missing values b) related potential variables. Further, the disclosed system may provide an Explainability (Input/Output). Further, the Explainability (Input/Output) may include creating a dashboard that shows a summary of the input data related to groups and how key groups fared once the model was run. Further, the disclosed system may provide an Explainability (Feature attribution). Further, the Explainability (Feature attribution) may include a Module and a dashboard that shows which features contributed and to what extent to the model decision. Further, the disclosed system may provide an Explainability (Code translation). Further, the Explainability (Code translation) may include taking R and translate it into English sentences that describe what is happening (also identifies potential risk factors) and can illustrate additionally in flow charts. Further, the disclosed system may provide a Bias Report (Prejudice bias). Further, the Bias Report (Prejudice bias) determines the representation of gender, race, religion, age, sexuality, country, state and produces various automatic visualizations that show these dimensions and identify potential gaps (underrepresentation). Further, the disclosed system may provide an Explainability (Code translation). Further, the Explainability (Code translation) may include taking Python and translate it into English sentences that describe what is happening (also identifies potential risk factors) and can illustrate additionally in flow charts. Further, the disclosed system may provide a Bias Report (Selection bias). Further, the Bias Report (Selection bias) may include data that is not selected in a representative fashion. Further, the Bias Report (Selection bias) uses heat maps to highlight categorical variables such as Little coverage of values (Yellow) •Lack of a value (as identified by NLP process) (Red) •Apparent sufficient coverage (Green). Further, the Bias Report (Selection bias) may create scatterplots to show coverage of each selected variable by time, geography, or user selected variables such as •Ability to save analysis •Ability to annotate analysis in Data Scientist notebook. Further, the disclosed system may provide a Bias Report (Reporting bias). Further, the Bias Report (Reporting bias) may analyze coverage of the variable values by time dimensions and highlight gaps, and performs internet research to determine typical frequency benchmark and compare to the data. Further, the disclosed system may create a stock dashboard analysis for input data including Gender analysis, Racial analysis, Geographic analysis, Age analysis, Religion based on mapping data in source data to Universal Data Models (UDM). Further, the disclosed system may provide a Case management. Further, the Case management may include an ability to open a review of a specific model and to task team members to provide documentation and perform analysis. Further, the disclosed system may include a Scoring module. Further, the Scoring module provides an ability to add weightings based on questions and tests. Further, the disclosed system may provide Internationalization, User and tenant management, Log in & Registration, Enabling messaging within the system or via email, and Payment module. Further, the disclosed system may provide an Explainability (Feature attribution). Further, the Explainability (Feature attribution) may include Module and dashboard that shows which features contributed and to what extent to the model decision (expand to Tensorflow, Microsoft Data Science, & Amazon). Further, the disclosed system may provide an Explainability (Feature attribution). Further, the Explainability (Feature attribution) may include Module and dashboard that shows which features contributed and to what extent to the model decision (expand to remaining other Python Libraries). Further, the disclosed system may provide an Explainability (Feature attribution). Further, the Explainability (Feature attribution) may include a Module and dashboard that shows which features contributed and to what extent to the model decision (expand to R). Further, the disclosed system may provide a Desktop Based Documentation Widget. Further, the disclosed system may enable a Legal and Compliance or an Auditor to examine AI risk at a high level and then probe specific areas. Further, the disclosed system may enable Sr. Executives to understand the AI in use, where, business penetration, impact, and risk factors. Further, the disclosed system may provide an Annual/Quarterly Algorithm Report (similar to a financial statement for algorithms) that illustrates where algorithms are used, for what, how many transactions and S for the period, selected explanations, and risk factors; whether connected to financial reporting; whether audited. Further, the disclosed system may include a Bias module 1 that automates adding to bias module database akin to a google search. Further, the disclosed system may include a Data Scientist Notebook that captures documentation from the DSRM process and add context. Further, the disclosed system may be valuable to the data scientist to document and improve models (ex. mitigate bias, document how it works, make it easier to explain to others). Further, the disclosed system may be valuable to Legal, compliance, and executives to understand where AI is in use, for what, how it works, the presence of any risk factors, and a means to further look into and mitigate concerns. Further, the disclosed system may provide an Output risk module that provides an ability to assign risk scoring to outcomes of models. Further, the disclosed system may include an ability to auto-import models from Rapidminer and an ability to auto-import models from Alteryx. Further, the disclosed system may provide connectivity to G/L systems (or others) to auto evaluate/import the Model using some of the toolings. Further, the disclosed system may import/export to Github. Further, the disclosed system may include an ability to select a search engine to use with Bias Module. Further, the disclosed system may be used for the creation of external data scientists' on-demand network (ala uber). Further, a user can elect to request a data science auditor to review against a framework or for specific risk factors or concerns. Further, the disclosed system may import/export to Kaggle (Data and Models). Further, the disclosed system may provide an Explainability (Code translation) that create short summaries of the code translation summaries to explain what the model does. Further, the disclosed system may include an ability to set up notifications of finalization of models, changes, response to inquiries, etc., an ability to set up notifications of finalization of models, changes, response to inquiries, etc., an ability to search for models based on a variety of data elements (type, jurisdiction, the involvement of third party data or models, risk factors, tags, departments, employees, business process, etc.), and an ability to add notes, add tags, assign to workflow management\case management for legal, compliance, or internal\external audit purposes o Send inquiries to individuals and teams o Ability to attach work product. Further, the disclosed system may assess risk aligned to regional and country-specific laws governing algorithms. Further, the disclosed system may assist a Data scientist with what is the best workflow for saving documentation during model creation. Further, the disclosed system may perform a Bias Analysis for attempting to build bias analysis for all bias types. Further, the disclosed system may perform an Artifact import comprising Importing or linking to the artifact in the data science process •Storing link to the artifact and/or copy of the artifact version to Captures date and What artifact is for which is user defined (free text plus configurable fields) •Identifying embedded comments and offers an option to initiate wizard to utilize comments to explain the purpose of artifact and how it works. Further, the disclosed system may include a Library module that •Defines the organizational structure and departments •Imports or link to employee list •comprises an ability to track the summary stats of records affected by date (this would need to be imported through a separate process)* •comprises an ability to view holistic reports of machine models by the department, type, business process, other custom tags, etc. •comprises an ability to customize fields in the library •Generates interactive reports of where models are being used. Further, the disclosed system may include a Library (step 1) that comprises •an ability to create a model summary report that includes key facts about the model: o Purpose o Data used o History o Bias Analysis. Further, the disclosed system may include Workflow where rules can be set up that state that models (entries) that have certain features must go into review management and be routed to certain users v Automatic rules can be set up that dictate that certain actions or protocols are followed depending on the information in the system (ex presence of a risk factor). Further, the disclosed system may assist a Data scientist to determine does the bias module help improve the module. Further, the disclosed system may assist a Data scientist does the feature attribution help to understand how the model made its decisions.

Further, the disclosed system may include three lines of code to be part of ML/AI execution to capture metrics via API (ala google analytics). Further, the disclosed system Integrates with GRC tools. Further, the disclosed system may include a Self-healing AI—Bias and an AI Ethics personalized recommendation system.

Referring now to figures, FIG. 1 is an illustration of an online platform 100 consistent with various embodiments of the present disclosure. By way of non-limiting example, the online platform 100 to facilitate analysis of a model may be hosted on a centralized server 102, such as, for example, a cloud computing service. The centralized server 102 may communicate with other network entities, such as, for example, a mobile device 106 (such as a smartphone, a laptop, a tablet computer etc.), other electronic devices 110 (such as desktop computers, server computers etc.), databases 114, and sensors 116 over a communication network 104, such as, but not limited to, the Internet. Further, users of the online platform 100 may include relevant parties such as, but not limited to, end-users, administrators, service providers, service consumers and so on. Accordingly, in some instances, electronic devices operated by the one or more relevant parties may be in communication with the platform.

A user 112, such as the one or more relevant parties, may access online platform 100 through a web based software application or browser. The web based software application may be embodied as, for example, but not be limited to, a website, a web application, a desktop application, and a mobile application compatible with a computing device 1900.

Figure 2:
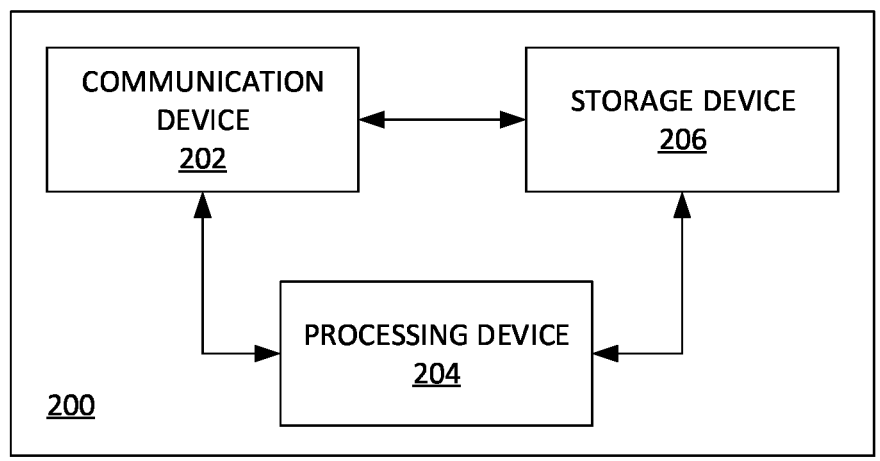
FIG. 2 is a block diagram of a system for facilitating analysis of a model, in accordance with some embodiments.

FIG. 2 is a block diagram of a system 200 for facilitating analysis of a model, in accordance with some embodiments. Accordingly. the system 200 may include a communication device 202 configured for receiving at least one model data associated with at least one model from at least one user device. Further, the at least one model data may include at least one source data associated with the at least one model. Further, the at least one model may include at least one machine learning model. Further, the at least one source data may be used to train the at least one machine learning model. Further, the at least one user device may be associated with at least one user. Further, the at least one user may include at least one model creator. Further, the at least one user device may include a computing device such as a laptop, a desktop, a tablet, a smartphone, a smartwatch, and so on.

Further, the communication device 202 may be configured for transmitting a notification to the at least one user device. Further, the system 200 may include a processing device 204 communicatively coupled with the communication device 202. Further, the processing device 204 may be configured for assessing the at least one model data. Further, the processing device 204 may be configured for identifying at least one field associated with the at least one model based on the assessing. Further, the at least one field may include at least one risk field. Further, the at least one field may include at least one variable. Further, the processing device 204 may be configured for analyzing the at least one field based on the identifying of the at least one field. Further, the processing device 204 may be configured for identifying at least one related field associated with the at least one field based on the analyzing of the at least one field. Further, the at least one related field may include at least one related variable. Further, the at least one field may be associated with the at least one related field through at least one relationship. Further, the at least one relationship may include at least one entity relationship, at least one ontological relationship, etc. Further, the processing device 204 may be configured for analyzing the at least one related field based on the at least one model. Further, the processing device 204 may be configured for generating the notification based on the analyzing of the at least one related field. Further, the system 200 may include a storage device 206 communicatively coupled with the processing device 204. Further, the storage device 206 may be configured for storing the at least one model data and the at least one model.

Further, in some embodiments, the processing device 204 may be configured for determining at least one characteristic of the at least one related field based on the analyzing. Further, the at least one characteristic may be associated with at least one type of the at least one bias. Further, the processing device 204 may be configured for determining at least one bias associated with the at least one model based on the determining of the at least one characteristic. Further, the at least one bias corresponds to the at least one characteristic of the at least one related field. Further, the processing device 204 may be configured for generating at least one result based on the determining of the at least one bias. Further, the at least one result may include the at least one bias. Further, the communication device 202 may be configured for transmitting the at least one result to the at least one user device.

Further, in some embodiments, the processing device 204 may be configured for identifying at least one value associated with the at least one field based on the analyzing of the at least one field. Further, the processing device 204 may be configured for comparing the at least one value with at least one related value. Further, the processing device 204 may be configured for identifying at least one match between the at least one value and the at least one related value. Further, the storage device 206 may be configured for retrieving the at least one related value based on the identifying of the at least one value. Further, the identifying of the at least one related field may be based on the identifying of the at least one match.

Further, in some embodiments, the communication device 202 may be configured for transmitting the at least one match to the at least one user device. Further, the communication device 202 may be configured for receiving at least one confirmation on the at least one match from the at least one user device. Further, the identifying of the at least one related field may be based on the at least one confirmation.

Further, in some embodiments, the storage device 206 may be configured for retrieving at least one field description associated with the at least one field based on the analyzing of the at least one field. Further, the processing device 204 may be configured for generating at least one ontology of the at least one field based on the at least one field description. Further, the identifying of the at least one related field may be based on the at least one ontology.

Further, in some embodiments, the at least one model generates at least one output based on the at least one model data. Further, the at least one model data may include at least one value corresponding to the at least one output. Further, the communication device 202 may be configured for receiving at least one value adjust data associated with the at least one value from the at least one user device. Further, the communication device 202 may be configured for transmitting at least one result to the at least one user device. Further, the processing device 204 may be configured for modifying the at least one value based on the at least one value adjust data. Further, the processing device 204 may be configured for generating at least one modified value based on the modifying. Further, the at least one model generates at least one modified output based on the at least one modified value. Further, the processing device 204 may be configured for comparing the at least one output and the at least one modified output. Further, the processing device 204 may be configured for determining at least one bias associated with the at least one model based on the comparing. Further, the processing device 204 may be configured for generating the at least one result based on the determining of the at least one bias. Further, the at least one result may include the at least one bias.

Further, in some embodiments, the communication device 202 may be configured for receiving at least one model action associated with the at least one model from the at least one user device. Further, the at least one model action may be associated with generating of the at least one model. Further, the at least one model creator may be a data scientist. Further, the at least one model creator may be an individual that may want to create and use the at least one model. Further, the processing device 204 may be configured for analyzing the at least one model action. Further, the processing device 204 may be configured for generating at least one artifact corresponding to the at least one model action based on the analyzing the at least one model action. Further, the at least one artifact facilitates auditing of the at least one model. Further, the storage device 206 may be configured for storing the at least one artifact.

Further, in some embodiments, the processing device 204 may be configured for analyzing the at least one artifact. Further, the processing device 204 may be configured for determining at least one risk associated with the at least one model based on the analyzing of the at least one artifact. Further, the processing device 204 may be configured for generating at least one risk result based on the determining of the at least one risk. Further, the at least one risk result may include the at least one risk. Further, the communication device 202 may be configured for transmitting the at least one risk result to the at least one user device.

Further, in some embodiments, the at least one risk may be associated with at least one risk indicator. Further, the processing device 204 may be configured for flagging the at least one model with the at least one risk indicator based on the determining of the at least one risk associated with the at least one model. Further, the storage device 206 may be configured for storing the at least one risk indicator and the at least one model associated with the at least one risk indicator.

Further, in some embodiments, the processing device 204 may be configured for identifying at least one missing value based on at least one of the analyzing of the at least one field and the analyzing of the at least one related field. Further, the processing device 204 may be configured for determining at least one risk associated with the at least one model based on the identifying of the at least one missing value. Further, the processing device 204 may be configured for generating at least one risk result based on the determining of the at least one risk. Further, the at least one risk result may include the at least one risk. Further, the communication device 202 may be configured for transmitting the at least one risk result to the at least one user device.

Figure 3:
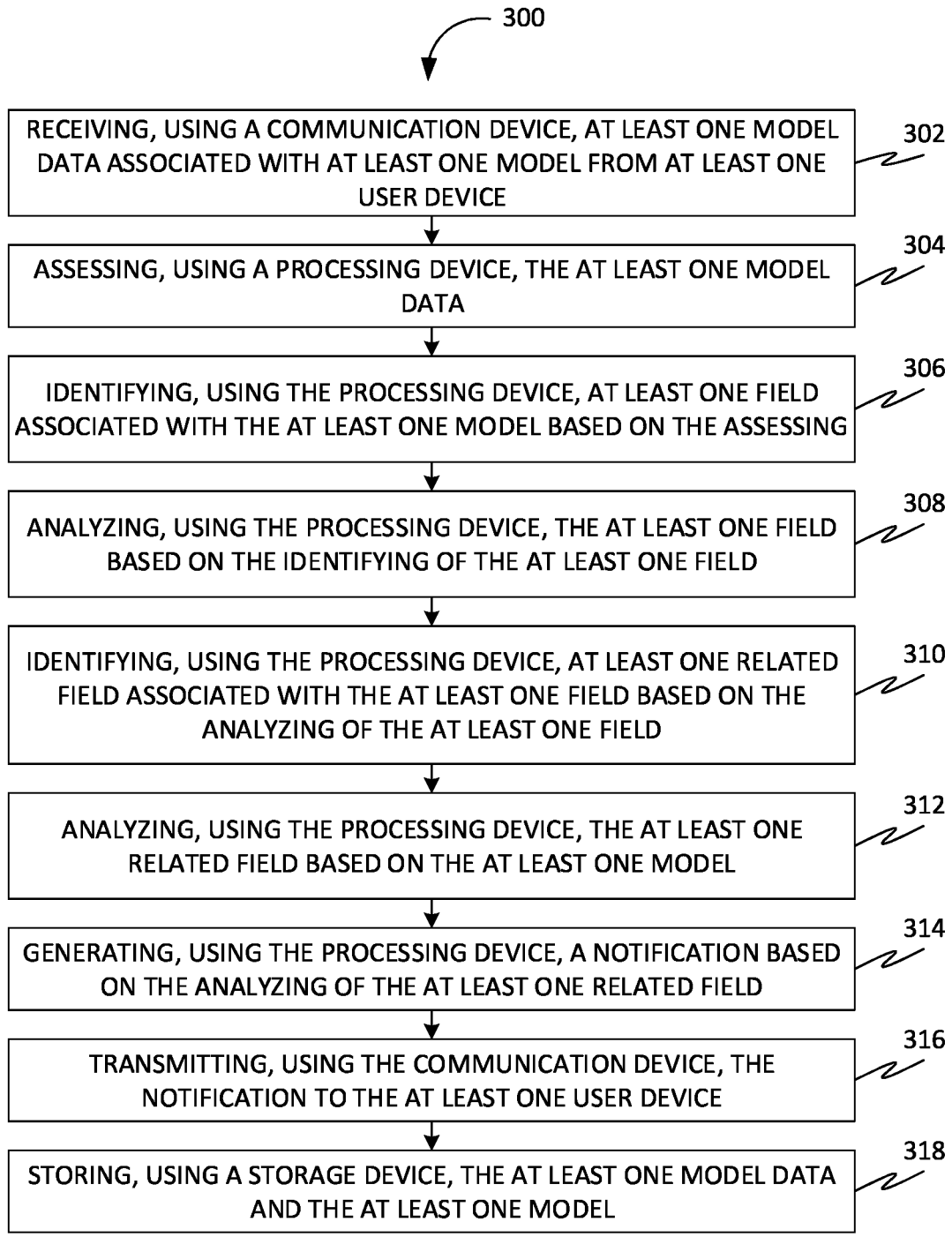
FIG. 3 is a flowchart of a method for facilitating analysis of a model, in accordance with some embodiments.

FIG. 3 is a flowchart of a method 300 for facilitating analysis of a model, in accordance with some embodiments. Accordingly, at 302, the method 300 may include receiving, using a communication device, at least one model data associated with at least one model from at least one user device.

Further, at 304, the method 300 may include assessing, using a processing device, the at least one model data.

Further, at 306, the method 300 may include identifying, using the processing device, at least one field associated with the at least one model based on the assessing. Further, at 308, the method 300 may include analyzing, using the processing device, the at least one field based on the identifying of the at least one field.

Further, at 310, the method 300 may include identifying, using the processing device, at least one related field associated with the at least one field based on the analyzing of the at least one field. Further, the at least one field may be associated with the at least one related field through at least one relationship.

Further, at 312, the method 300 may include analyzing, using the processing device, the at least one related field based on the at least one model.

Further, at 314, the method 300 may include generating, using the processing device, a notification based on the analyzing of the at least one related field.

Further, at 316, the method 300 may include transmitting, using the communication device, the notification to the at least one user device.

Further, at 318, the method 300 may include storing, using a storage device, the at least one model data and the at least one model.

Figure 4:
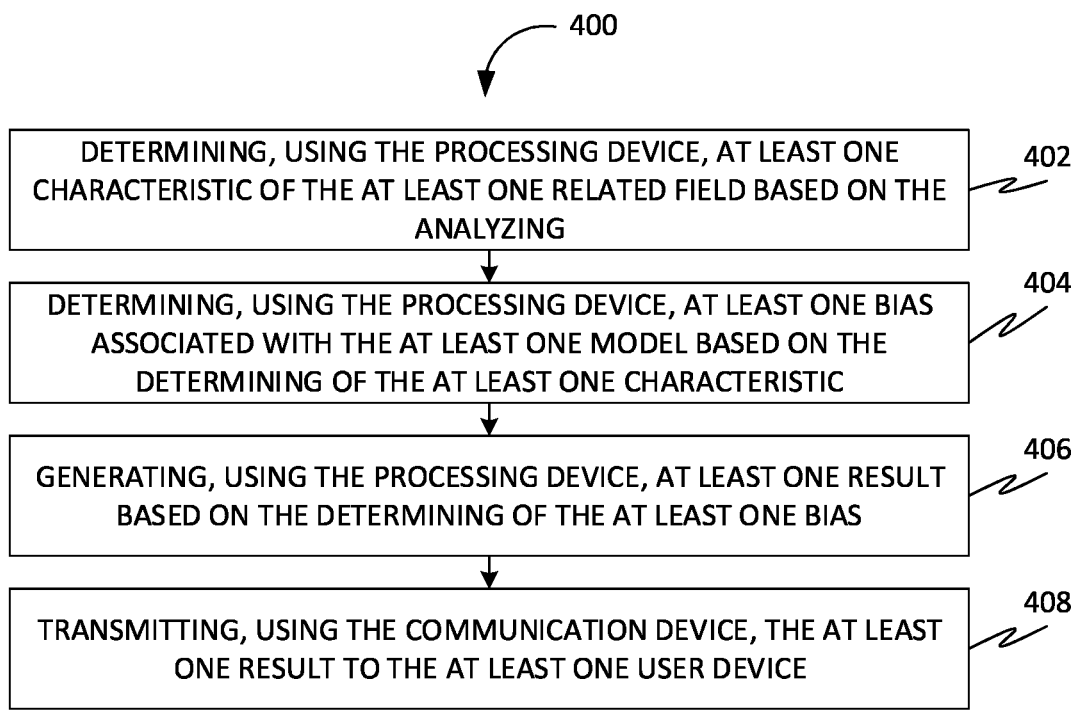
FIG. 4 is a flowchart of a method for generating at least one result for facilitating the analysis of the model, in accordance with some embodiments.

FIG. 4 is a flowchart of a method 400 for generating at least one result for facilitating the analysis of the model, in accordance with some embodiments. Accordingly, at 402, the method 400 may include determining, using the processing device, at least one characteristic of the at least one related field based on the analyzing.

Further, at 404, the method 400 may include determining, using the processing device, at least one bias associated with the at least one model based on the determining of the at least one characteristic. Further, the at least one bias corresponds to the at least one characteristic of the at least one related field.

Further, at 406, the method 400 may include generating, using the processing device, at least one result based on the determining of the at least one bias. Further, the at least one result may include the at least one bias.

Further, at 408, the method 400 may include transmitting, using the communication device, the at least one result to the at least one user device.

Figure 5:
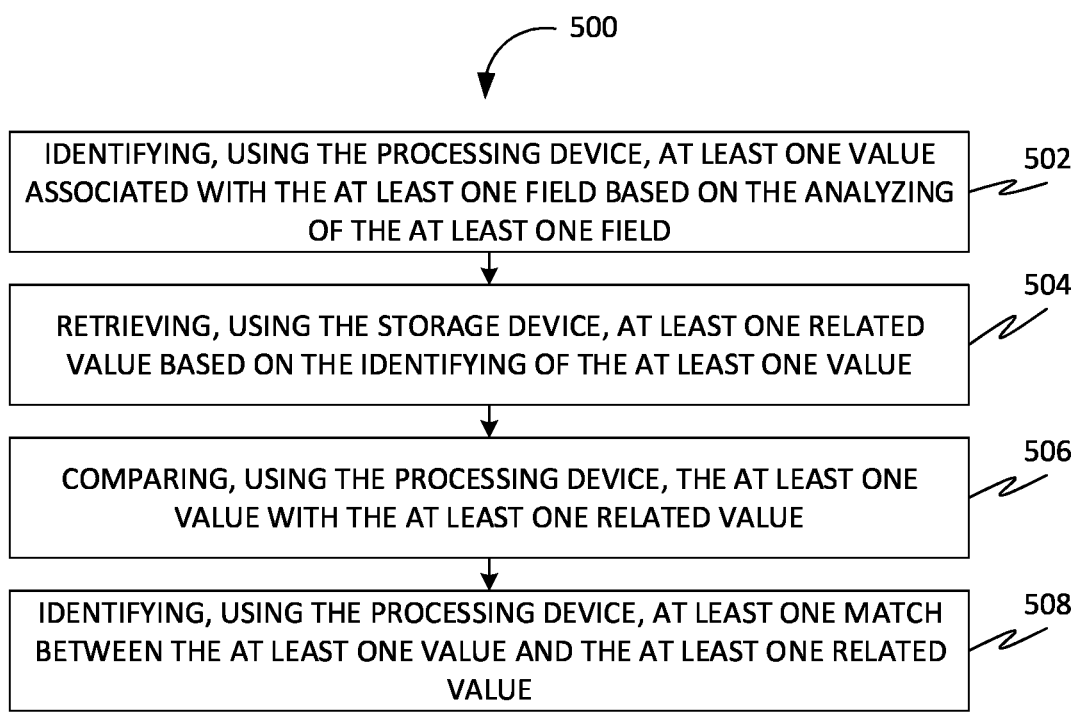
FIG. 5 is a flowchart of a method for identifying at least one match for facilitating the analysis of the model, in accordance with some embodiments.

FIG. 5 is a flowchart of a method 500 for identifying at least one match for facilitating the analysis of the model, in accordance with some embodiments. Accordingly, at 502, the method 500 may include identifying, using the processing device, at least one value associated with the at least one field based on the analyzing of the at least one field.

Further, at 504, the method 500 may include retrieving, using the storage device, at least one related value based on the identifying of the at least one value.

Further, at 506, the method 500 may include comparing, using the processing device, the at least one value with the at least one related value.

Further, at 508, the method 500 may include identifying, using the processing device, at least one match between the at least one value and the at least one related value. Further, the identifying of the at least one related field may be based on the identifying of the at least one match.

Figure 6:
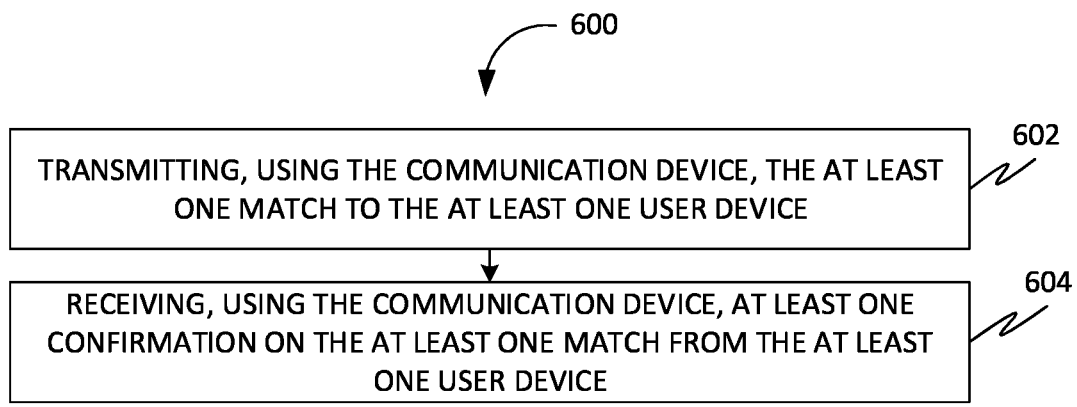
FIG. 6 is a flowchart of a method for identifying the at least one related field for facilitating the analysis of the model, in accordance with some embodiments.

FIG. 6 is a flowchart of a method 600 for identifying the at least one related field for facilitating the analysis of the model, in accordance with some embodiments. Accordingly, at 602, the method 600 may include transmitting, using the communication device, the at least one match to the at least one user device.

Further, at 604, the method 600 may include receiving, using the communication device, at least one confirmation on the at least one match from the at least one user device. Further, the identifying of the at least one related field may be based on the at least one confirmation.

Figure 7:
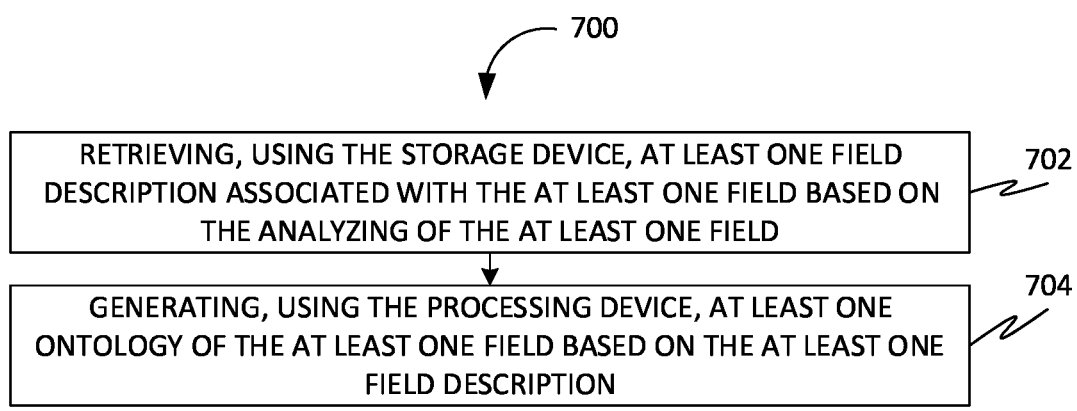
FIG. 7 is a flowchart of a method for generating at least one ontology for facilitating the analysis of the model, in accordance with some embodiments.

FIG. 7 is a flowchart of a method 700 for generating at least one ontology for facilitating the analysis of the model, in accordance with some embodiments. Accordingly, at 702, the method 700 may include retrieving, using the storage device, at least one field description associated with the at least one field based on the analyzing of the at least one field.

Further, at 704, the method 700 may include generating, using the processing device, at least one ontology of the at least one field based on the at least one field description. Further, the identifying of the at least one related field may be based on the at least one ontology.

Figure 8:
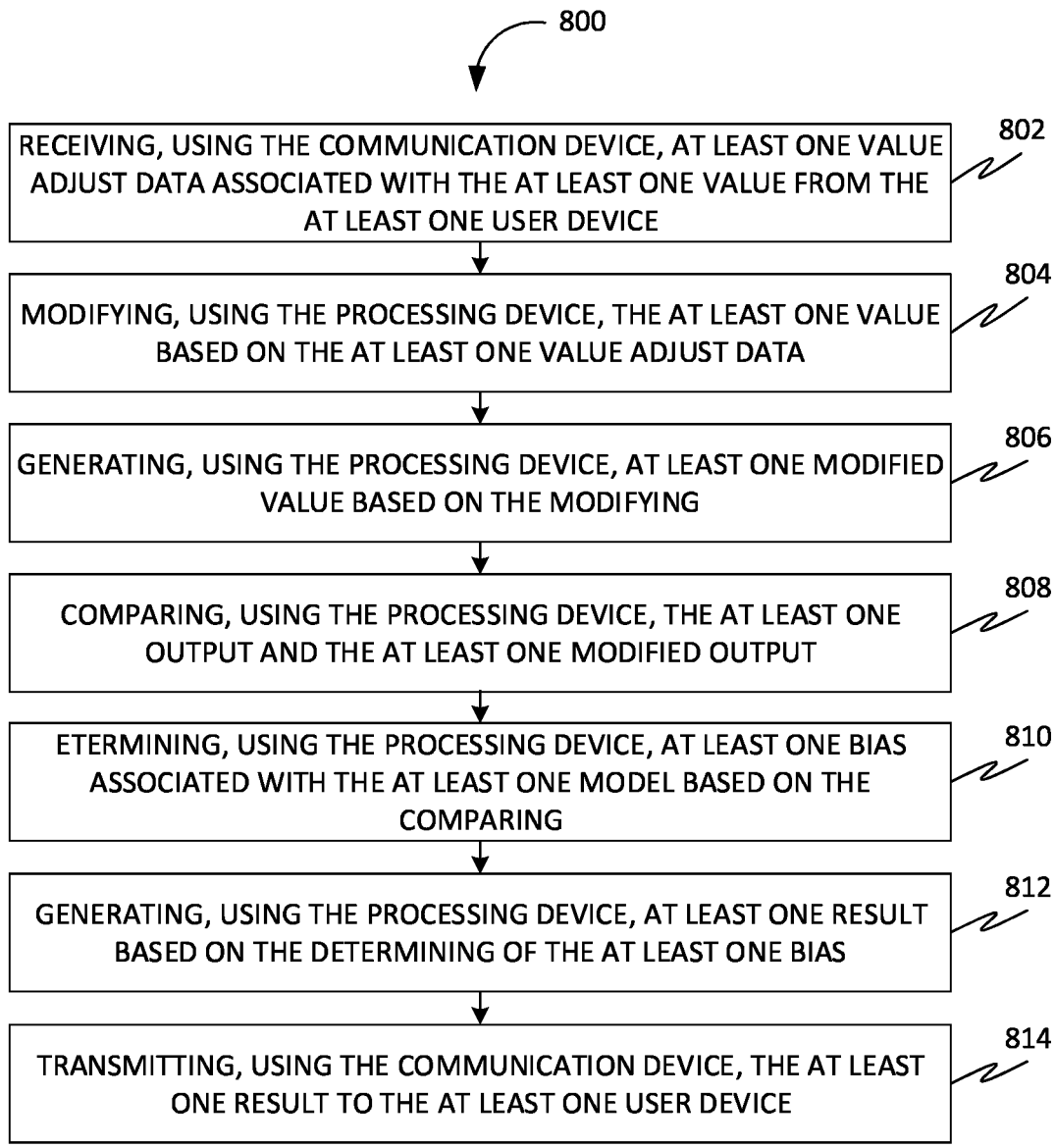
FIG. 8 is a flowchart of a method for generating at least one result for facilitating the analysis of the model, in accordance with some embodiments.

FIG. 8 is a flowchart of a method 800 for generating at least one result for facilitating the analysis of the model, in accordance with some embodiments. Accordingly, the at least one model generates at least one output based on the at least one model data. Further, the at least one model data may include at least one value corresponding to the at least one output. Further, at 802, the method 800 may include receiving, using the communication device, at least one value adjust data associated with the at least one value from the at least one user device.

Further, at 804, the method 800 may include modifying, using the processing device, the at least one value based on the at least one value adjust data.

Further, at 806, the method 800 may include generating, using the processing device, at least one modified value based on the modifying. Further, the at least one model generates at least one modified output based on the at least one modified value.

Further, at 808, the method 800 may include comparing, using the processing device, the at least one output and the at least one modified output.

Further, at 810, the method 800 may include determining, using the processing device, at least one bias associated with the at least one model based on the comparing.

Further, at 812, the method 800 may include generating, using the processing device, at least one result based on the determining of the at least one bias. Further, the at least one result may include the at least one bias.

Further, at 814, the method 800 may include transmitting, using the communication device, the at least one result to the at least one user device.

Figure 9:
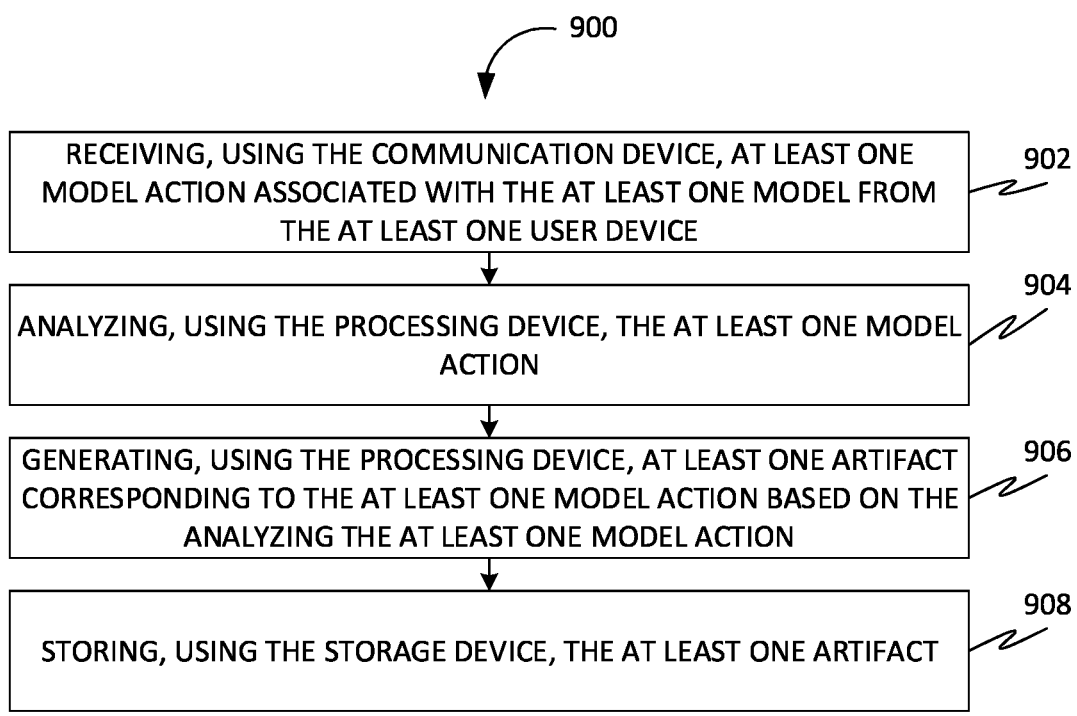
FIG. 9 is a flowchart of a method for generating at least one artifact for facilitating the analysis of the model, in accordance with some embodiments.

FIG. 9 is a flowchart of a method 900 for generating at least one artifact for facilitating the analysis of the model, in accordance with some embodiments. Accordingly, at 902, the method 900 may include receiving, using the communication device, at least one model action associated with the at least one model from the at least one user device. Further, the at least one model action may be associated with generating of the at least one model.

Further, at 904, the method 900 may include analyzing, using the processing device, the at least one model action.

Further, at 906, the method 900 may include generating, using the processing device, at least one artifact corresponding to the at least one model action based on the analyzing the at least one model action. Further, the at least one artifact facilitates auditing of the at least one model.

Further, at 908, the method 900 may include storing, using the storage device, the at least one artifact.

Figure 10:
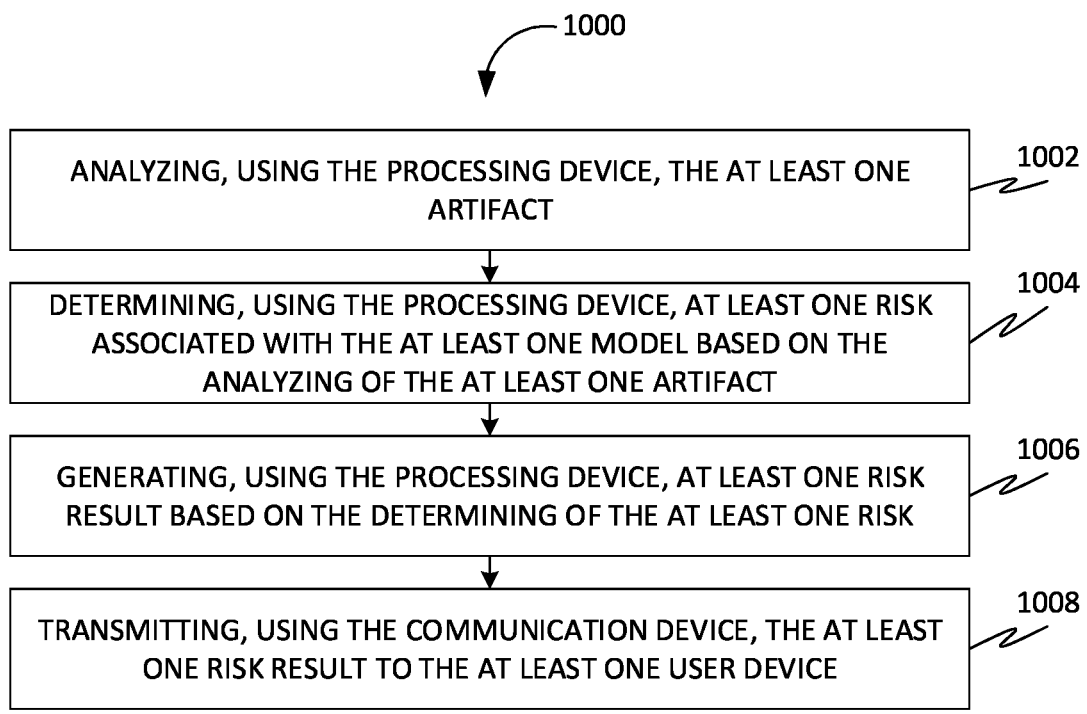
FIG. 10 is a flowchart of a method for generating at least one risk result for facilitating the analysis of the model, in accordance with some embodiments.

FIG. 10 is a flowchart of a method 1000 for generating at least one risk result for facilitating the analysis of the model, in accordance with some embodiments. Accordingly, at 1002, the method 1000 may include analyzing, using the processing device, the at least one artifact.

Further, at 1004, the method 1000 may include determining, using the processing device, at least one risk associated with the at least one model based on the analyzing of the at least one artifact.

Further, at 1006, the method 1000 may include generating, using the processing device, at least one risk result based on the determining of the at least one risk. Further, the at least one risk result may include the at least one risk.

Further, at 1008, the method 1000 may include transmitting, using the communication device, the at least one risk result to the at least one user device.

Figure 11:
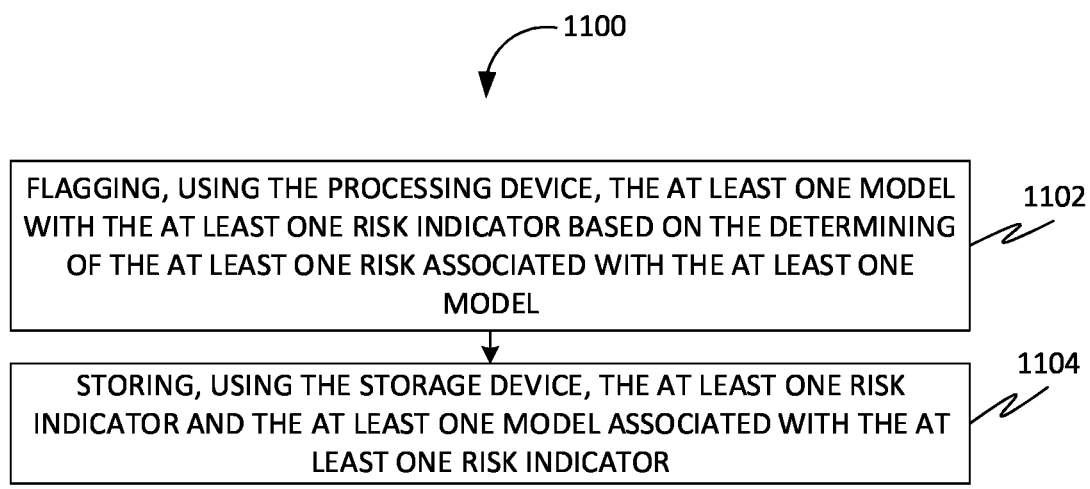
FIG. 11 is a flowchart of a method for flagging the at least one model for facilitating the analysis of the model, in accordance with some embodiments.

FIG. 11 is a flowchart of a method 1100 for flagging the at least one model for facilitating the analysis of the model, in accordance with some embodiments. Accordingly, the at least one risk may be associated with at least one risk indicator. Further, at 1102, the method 1100 may include flagging, using the processing device, the at least one model with the at least one risk indicator based on the determining of the at least one risk associated with the at least one model.

Further, at 1104, the method 1100 may include storing, using the storage device, the at least one risk indicator and the at least one model associated with the at least one risk indicator.

Figure 12:
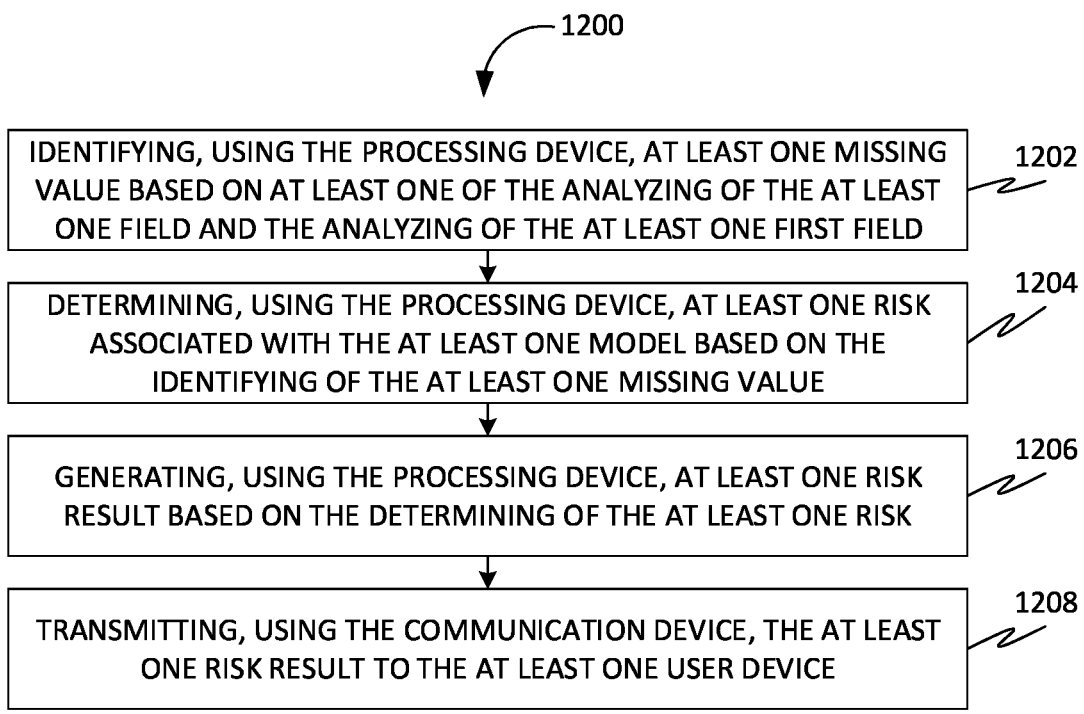
FIG. 12 is a flowchart of a method for generating at least one risk result for facilitating the analysis of the model, in accordance with some embodiments.

FIG. 12 is a flowchart of a method 1200 for generating at least one risk result for facilitating the analysis of the model, in accordance with some embodiments. Accordingly, at 1202, the method 1200 may include identifying, using the processing device, at least one missing value based on at least one of the analyzing of the at least one field and the analyzing of the at least one related field.

Further, at 1204, the method 1200 may include determining, using the processing device, at least one risk associated with the at least one model based on the identifying of the at least one missing value.

Further, at 1206, the method 1200 may include generating, using the processing device, at least one risk result based on the determining of the at least one risk. Further, the at least one risk result may include the at least one risk.

Further, at 1208, the method 1200 may include transmitting, using the communication device, the at least one risk result to the at least one user device.

Figure 13:
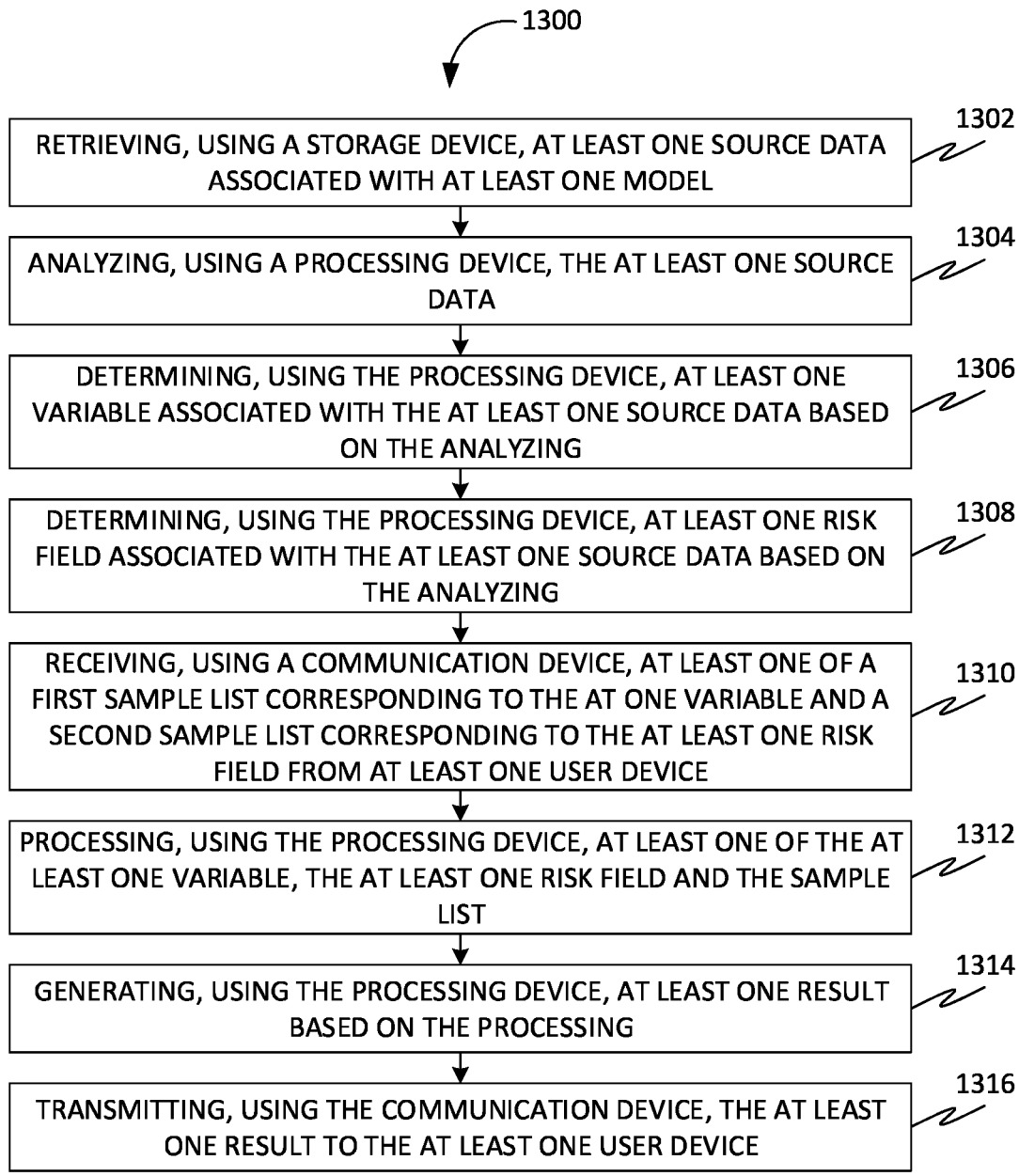
FIG. 13 is a flowchart of a method of facilitating bias analysis based on analyzing a source data, in accordance with some embodiments.

FIG. 13 is a flowchart of a method 1300 of facilitating bias analysis based on analyzing a source data, in accordance with some embodiments. Accordingly, at 1302, the method 1300 may include a step of retrieving, using a storage device, at least one source data associated with at least one model. Further, the at least one model may include a machine learning model. Further, the at least one source data may be used to train the at least one machine learning model.

Further, at 1304, the method 1300 may include a step of analyzing, using a processing device, the at least one source data.

Further, at 1306, the method 1300 may include a step of determining, using the processing device, at least one variable associated with the at least one source data based on the analyzing. Further, the at least one variable may include a categorical variable, a continuous variable, etc.

Further, at 1308, the method 1300 may include a step of determining, using the processing device, at least one risk field associated with the at least one source data based on the analyzing. Further, the at least one risk field may include at least one attribute corresponding to an entity in a dataset. For example, in a dataset including details of a plurality of persons, the at least one risk field may include a race, religion, citizenship, sex, age, height, weight, income, etc.

Further, at 1310, the method 1300 may include a step of receiving, using a communication device, a first sample list corresponding to the at one variable and a second sample list corresponding to the at least one risk field from at least one user device. Further, the at least one user device is associated with at least one user. Further, the at least one user device may include a smartphone, a mobile, a tablet, a laptop, a personal computer, and so on. Further, the at least one user may include an individual, an institution, and an organization that may want to perform bias analysis on a data.

Further, at 1312, the method 1300 may include a step of processing, using the processing device, at least one of the at least one variable, the at least one risk field and the sample list.

Further, at 1314, the method 1300 may include a step of generating, using the processing device, at least one result based on the processing. Further, the at least one result may include a confidence score associated with bias prediction of the at least one model based on the at least one source data. Further, the at least one result may include at least one function that may assist the user in determining the bias prediction of the at least one model. Further, the at least one function may include a visualization charts such as scatter plots, heat maps, etc.

Further, at 1316, the method 1300 may include a step of transmitting, using the communication device, the at least one result to the at least one user device.

Further, in an embodiment, the method 1300 may be executed on python. Further, the method 1300 may include connecting to a data set. Further, the method 1300 may include identifying variable types (categorical, numeric). Further, the method 1300 may include identifying numeric that is date or time-related. Further, the method 1300 may include identifying categorical variables in the model (independent vs dependent). Further, the method 1300 may include selecting predictor variables. Further, the method 1300 may include selecting one categorical variable and get a unique list of values. Further, the method 1300 may include searching the internet for a full list of potential values in the category. Further, the method 1300 may include comparing the list of values from NLP to a data set. Further, the method 1300 may include identifying gaps.

Figure 14:
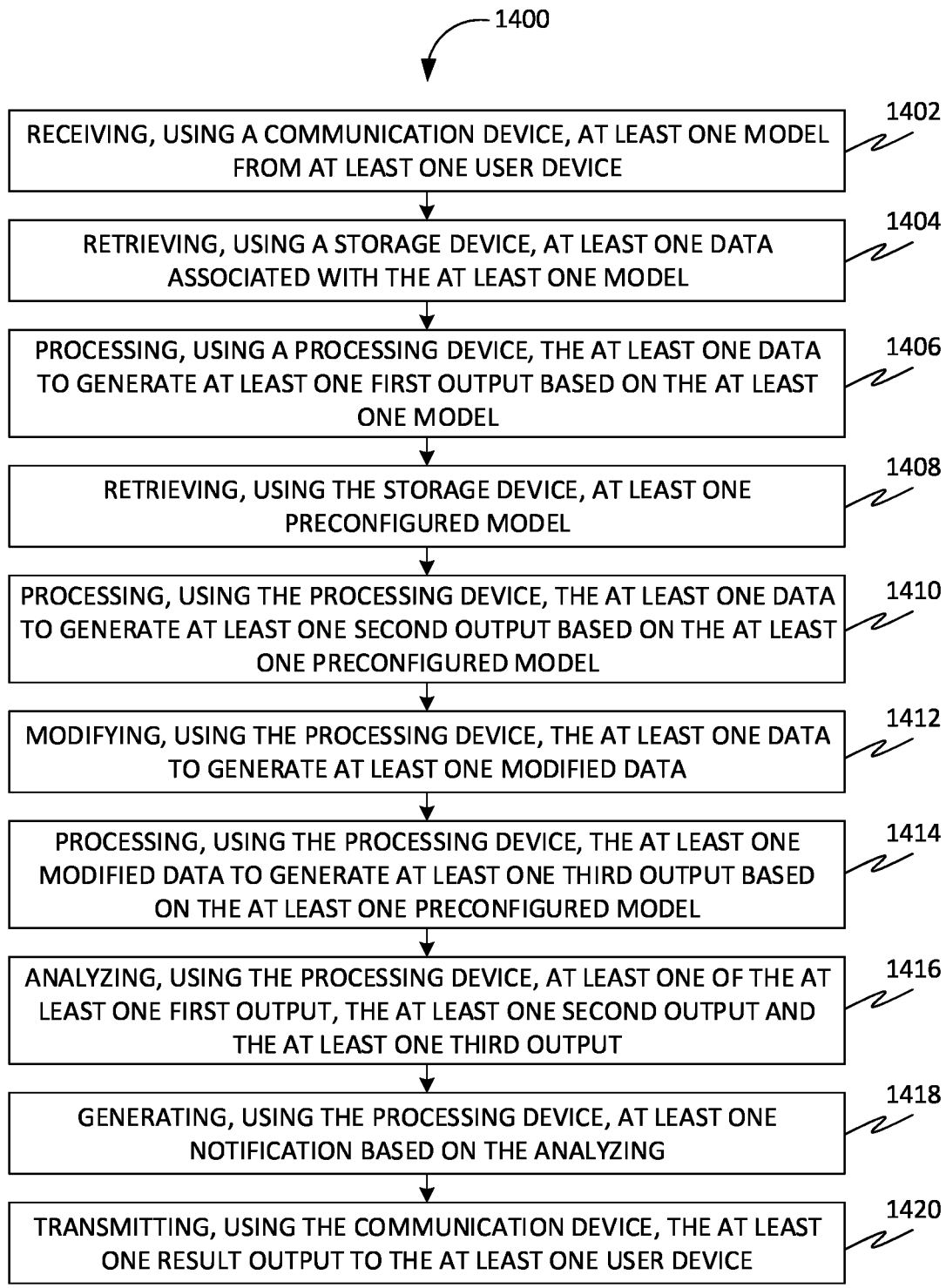
FIG. 14 is a flowchart of a method of facilitating bias analysis of model output, in accordance with some embodiments.

FIG. 14 is a flowchart of a method 1400 of facilitating bias analysis of model output, in accordance with some embodiments. Accordingly, at 1402, the method 1400 may include a step of receiving, using a communication device, at least one model from at least one user device. Further, the at least one model may include a machine learning model. Further, the at least one user device is associated with at least one user. Further, the at least one user device may include a smartphone, a mobile, a tablet, a laptop, a personal computer, and so on. Further, the at least one user may include an individual, an institution, and an organization that may want to perform bias analysis on a data.

Further, at 1404, the method 1400 may include a step of retrieving, using a storage device, at least one data associated with the at least one model. Further, the at least one data may be used by the at least one model to generate an output. Further, the at least one data may include a list of entities with corresponding variable fields.

Further, at 1406, the method 1400 may include a step of processing, using a processing device, the at least one data to generate at least one first output based on the at least one model. Further, the at least one first output may include a classification result, a prediction result, etc.

Further, at 1408, the method 1400 may include a step of retrieving, using the storage device, at least one pre-configured model. Further, the at least one pre-configured model may include a machine learning model such as fairML™, LIME™, etc.

Further, at 1410, the method 1400 may include a step of processing, using a processing device, the at least one data to generate at least one second output based on the at least one pre-configured model. Further, the at least second first output may include a classification result, a prediction result, etc.

Further, at 1412, the method 1400 may include a step of modifying, using the processing device, the at least one data to generate at least one modified data. Further, modifying the at least one data may include addition of an entity with at least one variable field of the variable fields to the list of entities.

Further, at 1414, the method 1400 may include a step of processing, using the processing device, the at least one modified data to generate at least one third output based on the at least one pre-configured model. Further, the at least one third output may include a classification result, a prediction result, etc.

Further, at 1416, the method 1400 may include a step of analyzing, using the processing device, at least one of the at least one first output, the at least one second output and the at least one third output.

Further, at 1418, the method 1400 may include a step of generating, using the processing device, at least one notification based on the analyzing. Further, the at least one notification may include a confidence score associated with bias prediction of the at least one model. Further, the at least one notification may include at least one function that may assist the user in determining the bias prediction of the at least one model. Further, the at least one function may include visualization charts such as scatter plots, heat maps, etc.

Further, at 1420, the method 1400 may include a step of transmitting, using the communication device, the at least one result output to the at least one user device.

Figure 15:
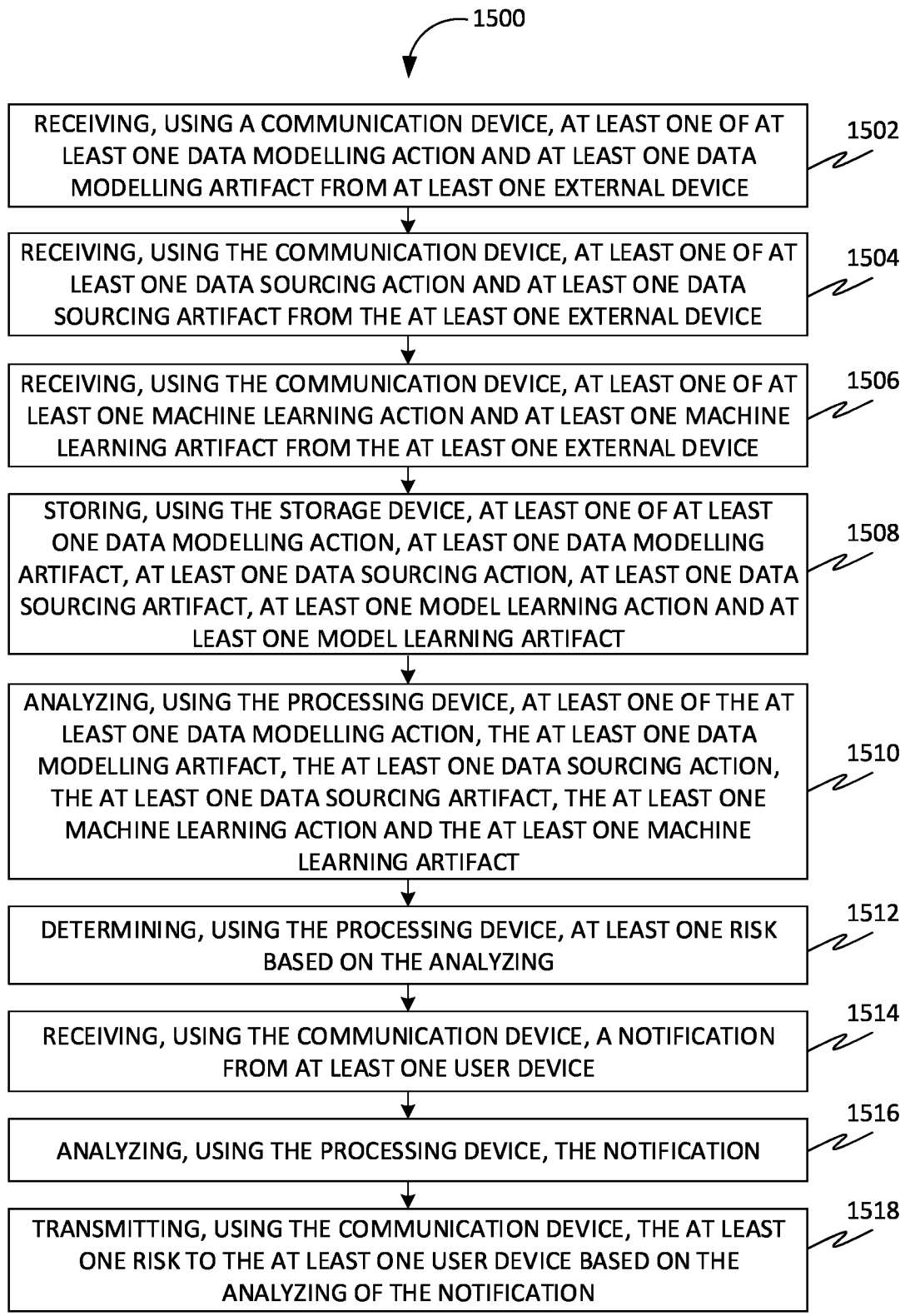
FIG. 15 is a flowchart of a method for facilitating determining a risk associated with a machine learning model, in accordance with some embodiments.

FIG. 15 is a flowchart of a method 1500 for facilitating determining a risk associated with a machine learning model, in accordance with some embodiments. Accordingly, at 1502, the method 1500 may include a step of receiving, using a communication device, at least one of at least one data modeling action and at least one data modeling artifact from at least one external device. Further, the at least one data modeling action may be associated with a data model. Further, the at least one data modeling action may facilitate generating and modifying the data model. Further, the data model may organize at least one attribute (such as at least one risk field) and display a relationship of the at least one attribute with at least one second attribute. Further, the at least one data modeling artifact may be associated with the at least one data modeling action. Further, the at least one data modeling artifact may include a first data (or code) associated with the at least one data modeling action. Further, the first data may include notes, comments, etc. Further, the at least one external device may include a smartphone, a mobile, a tablet, a laptop, and so on.

Further, at 1504, the method 1500 may include a step of receiving, using the communication device, at least one of at least one data sourcing action and at least one data sourcing artifact from the at least one external device. Further, the at least one data sourcing action is associated with at least one source data. Further, the at least one data sourcing action may facilitate receiving the at least one source data. Further, the at least one data sourcing action may include receiving the at least one source data from a data survey, literature sources, etc. Further, the at least one data sourcing artifact may be associated with the at least one data sourcing action. Further, the at least one data sourcing artifact may include a second data (or code). Further, the second data may include a timestamp, data source name, etc.

Further, at 1506, the method 1500 may include a step of receiving, using the communication device, at least one of at least one machine learning action and at least one machine learning artifact from the at least one external device. Further, the at least one machine learning action may include training a machine learning model, testing the machine learning model, and other operations associated with the machine learning model. Further, the at least one machine learning artifact may be associated with the at least one machine learning action. Further, the at least one machine learning artifact may include a third data (or code). Further, the third data may include comments, detailed specifications, interim reports, notes, etc.

Further, at 1508, the method 1500 may include a step of storing, using the storage device, at least one of at least one data modeling action, at least one data modeling artifact, at least one data sourcing action, at least one data sourcing artifact, at least one model learning action and at least one model learning artifact.

Further, at 1510, the method 1500 may include a step of analyzing, using the processing device, at least one of the at least one data modeling action, the at least one data modeling artifact, the at least one data sourcing action, the at least one data sourcing artifact, the at least one machine learning action and the at least one machine learning artifact.

Further, at 1512, the method 1500 may include a step of determining, using the processing device, at least one risk based on the analyzing. Further, a risk of the at least one risk may be associated with one of the at least one data modeling action, the at least one data modeling artifact, the at least one data sourcing action, the at least one data sourcing artifact, the at least one machine learning action and the at least one machine learning artifact. Further, a risk associated with the at least one data modeling action may be based on the at least one attribute, nature of data contained in the at least one attribute, relationship of the at least one attribute with the at least one second attribute, etc. Further, a risk associated with the at least one data sourcing action may include credibility of the data source, authenticity of the at least one source data, etc. Further, a risk associated with the at least one machine learning action may include an accuracy of algorithms used in the training and the testing of the machine learning model.

Further, at 1514, the method 1500 may include a step of receiving, using the communication device, a notification from at least one user device. Further, the at least one user device may be associated with at least one user. Further, the at least one user may include an individual, an institution, and an organization that may want to view the at least one risk. Further, the at least one user device may include a mobile, a tablet, a laptop, a smartphone, and so on.

Further, at 1516, the method 1500 may include a step of analyzing, using the processing device, the notification. Further, the notification may include a request for accessing the at least one risk.

Further, at 1518, the method 1500 may include a step of transmitting, using the communication device, the at least one risk to the at least one user device based on the analyzing of the notification.

Figure 16:
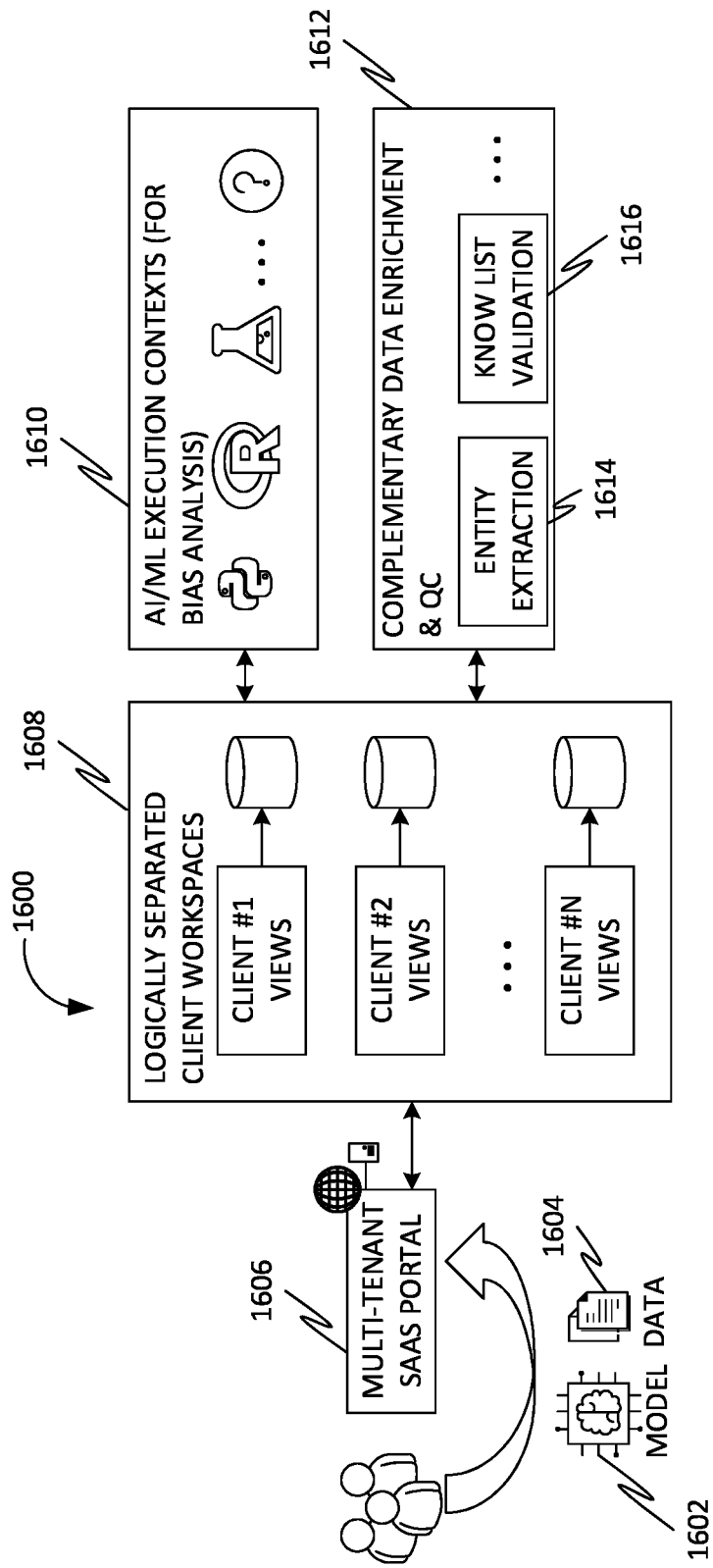
FIG. 16 is a schematic of a system associated with a compliance module, in accordance with some embodiments.

FIG. 16 is a schematic of a system 1600 associated with a compliance module, in accordance with some embodiments. Accordingly, the system 1600 (such as the system 200) may facilitate analysis of a model 1602. Further, the system 1600 may facilitate receiving of the model 1602 and data 1604 at a multi-tenant SaaS portal 1606. Further, the multi-tenant SaaS portal 1606 may be communicatively coupled to logically separated client workspaces 1608. Further, the system 1600 may include AI/ML execution contexts 1610 for the analysis (such as bias analysis) of the model 1602. Further, the system 1600 may facilitate complimentary data enrichment and QC 1612 that may include entity extraction 1614 and know list validation 1616.

Figure 17:
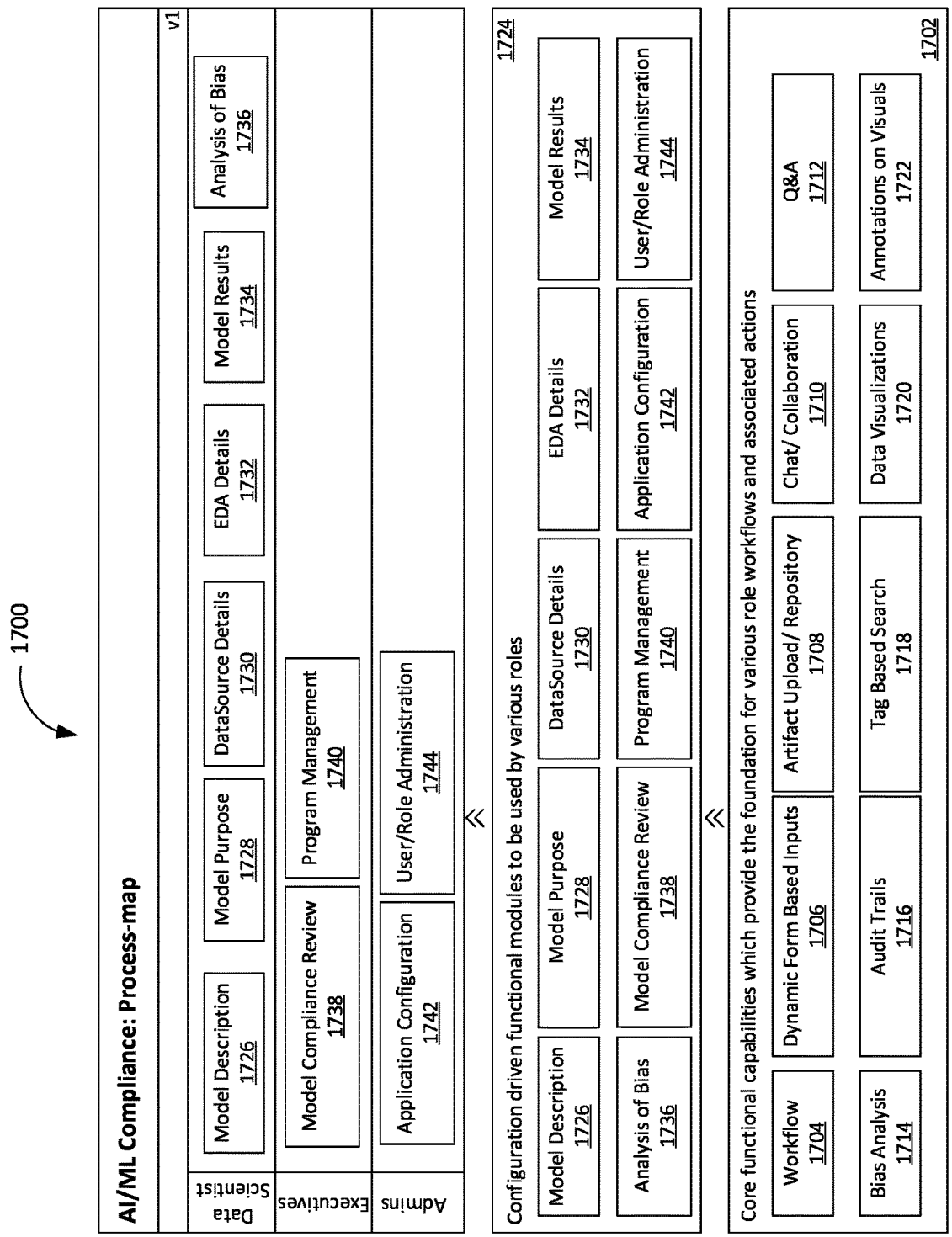
FIG. 17 is a flow diagram of a process of facilitating machine learning compliance, in accordance with some embodiments.

FIG. 17 is a flow diagram of a process 1700 of facilitating machine learning compliance, in accordance with some embodiments. Accordingly, at 1702, the process 1700 may include core functional capabilities that may provide a foundation of role workflows and associated actions. Further, the core functional capabilities may be associated with a workflow 1704. Further, the core functional capabilities may be associated with a dynamic form basic inputs 1706. Further, the core functional capabilities may be associated with an artifact upload/repository 1708. Further, the core functional capabilities may include a chat/collaboration 1710. Further, the core functional capabilities may be associated with a Q&A 1712. Further, the core functional capabilities may include a bias analysis 1714. Further, the core functional capabilities may include audit trails 1716. Further, the core functional capabilities may include a tag based search 1718. Further, the core functional capabilities may include data visualization 1720. Further, the core functional capabilities may include annotations on visuals 1722.

Further, at 1724, the process 1700 may include configurational driven functional modules to be used by various roles. Further, a first module of the configurational driven functional modules may be associated with a model description 1726. Further, a second module of the configurational driven functional modules may be associated with a model purpose 1728. Further, a third module of the configurational driven functional modules may be associated with data source details 1730. Further, a fourth module of the configurational driven functional modules may be associated with EDA details 1732. Further, a fifth module of the configurational driven functional modules may be associated with model results 1734. Further, a sixth module of the configurational driven functional modules may be associated with the analysis of bias 1736. Further, a seventh module of the configurational driven functional modules may be associated with model compliance review 1738. Further, an eighth module of the configurational driven functional modules may be associated with program management 1740. Further, a ninth module of the configurational driven functional modules may be associated with an application configuration 1742. Further, a tenth module of the configurational driven functional modules may be associated with a user/role administration 1744. Further, admins may be associated with the ninth module associated with the application configuration 1742 and the tenth module associated with the user/role administration 1744. Further, executives may be associated with the seventh module and the eighth module. Further, data scientists may be associated with the first module, the second module, the third module, the fourth module, the fifth module, and the sixth module.

Figure 18:
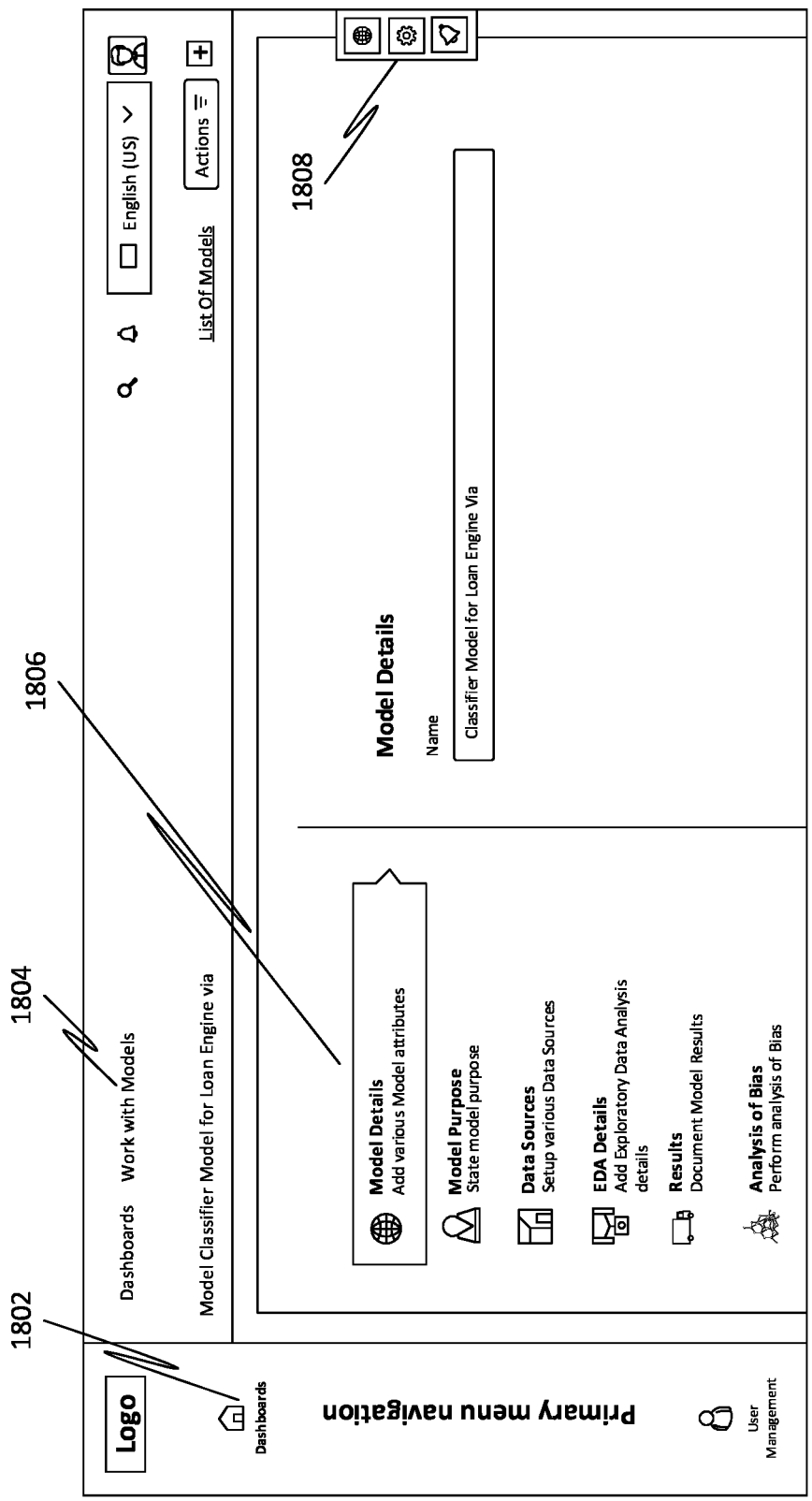
FIG. 18 is a screenshot of a user interface associated with a system, in accordance with some embodiments.

FIG. 18 is a screenshot of a user interface 1800 associated with a system, in accordance with some embodiments. Accordingly, the user interface 1800 may include a primary function navigation bar 1802, a secondary function bar 1804, a wizard-based workflow 1806, a hot action bar 1808, etc.

According to some embodiments, a method for facilitating analysis of a model is disclosed. Further, the method may include a step of receiving, using a communication device, at least one model data associated with at least one model from at least one user device. Further, the at least one model may include at least one machine learning model. Further, the method may include a step of analyzing, using a processing device, the at least one model data. Further, the method may include a step of identifying, using the processing device, at least one missing variable of the at least one model based on the analyzing. Further, the at least one model does not include the at least one missing variable. Further, the at least one missing variable may include at least one field. Further, the method may include a step of generating, using the processing device, a notification based on the identifying. Further, the method may include a step of transmitting, using the communication device, the notification to the at least one user device.

According to some embodiments, a method for facilitating analysis of a model is disclosed. Further, the method may include a step of receiving, using a communication device, at least one model data associated with at least one model from at least one user device. Further, the at least one model may include at least one machine learning model. Further, the method may include a step of analyzing, using a processing device, the at least one model data. Further, the method may include a step of determining, using the processing device, at least one bais associated with at least one of the at least one model data and the at least one model based on the analyzing. Further, the method may include a step of generating, using the processing device, a notification based on the determining. Further, the method may include a step of transmitting, using the communication device, the notification to the at least one user device.

According to some embodiments, a method for facilitating analysis of a model is disclosed. Further, the method may include a step of receiving, using a communication device, at least model action associated with at least one model from at least one user device. Further, the at least one model may include at least one machine learning model. Further, the at least one model action may be associated with the creation of the at least one model. Further, the method may include a step of storing, using a storage device, the at least one model action. Further, the storing of the at least one model action facilitates at least one of monitoring and auditing of the at least one model. Further, the method may include a step of analyzing, using the processing device, the at least one model action. Further, the method may include a step of generating, using the processing device, an explainability of the at least one model based on the analyzing. Further, the explainability may include a line by line code explaining, high-level flow chart generating, and detailed flow chart generating of the at least one model. Further, the method may include a step of transmitting, using the communication device, the explainability of the at least one model to the at least one user device.

Figure 19:
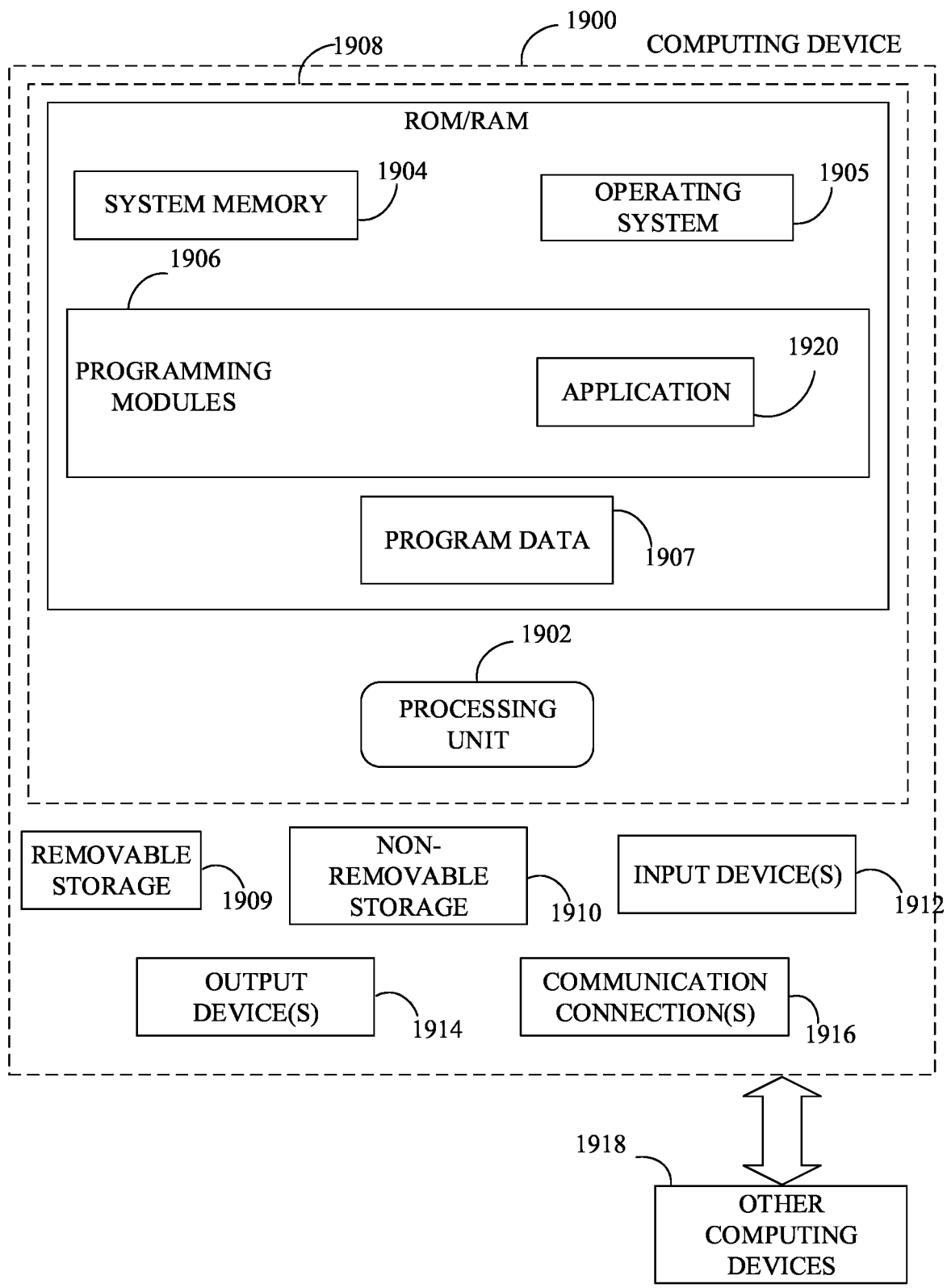
FIG. 19 is a block diagram of a computing device for implementing the methods disclosed herein, in accordance with some embodiments.

With reference to FIG. 19, a system consistent with an embodiment of the disclosure may include a computing device or cloud service, such as computing device 1900. In a basic configuration, computing device 1900 may include at least one processing unit 1902 and a system memory 1904. Depending on the configuration and type of computing device, system memory 1904 may comprise, but is not limited to, volatile (e.g. random-access memory (RAM)), non-volatile (e.g. read-only memory (ROM)), flash memory, or any combination. System memory 1904 may include operating system 1905, one or more programming modules 1906, and may include a program data 1907. Operating system 1905, for example, may be suitable for controlling computing device 1900's operation. In one embodiment, programming modules 1906 may include image-processing module, machine learning module. Furthermore, embodiments of the disclosure may be practiced in conjunction with a graphics library, other operating systems, or any other application program and is not limited to any particular application or system. This basic configuration is illustrated in FIG. 19 by those components within a dashed line 1908.

Computing device 1900 may have additional features or functionality. For example, computing device 1900 may also include additional data storage devices (removable and/or non-removable) such as, for example, magnetic disks, optical disks, or tape. Such additional storage is illustrated in FIG. 19 by a removable storage 1909 and a non-removable storage 1910. Computer storage media may include volatile and non-volatile, removable and non-removable media implemented in any method or technology for storage of information, such as computer-readable instructions, data structures, program modules, or other data. System memory 1904, removable storage 1909, and non-removable storage 1910 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 1900. Any such computer storage media may be part of device 1900. Computing device 1900 may also have input device(s) 1912 such as a keyboard, a mouse, a pen, a sound input device, a touch input device, a location sensor, a camera, a biometric sensor, etc. Output device(s) 1914 such as a display, speakers, a printer, etc. may also be included. The aforementioned devices are examples and others may be used.

Computing device 1900 may also contain a communication connection 1916 that may allow device 1900 to communicate with other computing devices 1918, such as over a network in a distributed computing environment, for example, an intranet or the Internet. Communication connection 1916 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 1904, including operating system 1905. While executing on processing unit 1902, programming modules 1906 (e.g., application 1920) may perform processes including, for example, one or more stages of methods, algorithms, systems, applications, servers, databases as described above. The aforementioned process is an example, and processing unit 1902 may perform other processes. Other programming modules that may be used in accordance with embodiments of the present disclosure may include machine learning applications.

Generally, consistent with embodiments of the disclosure, program modules may include routines, programs, components, data structures, and other types of structures that may perform particular tasks or that may implement particular abstract data types. Moreover, embodiments of the disclosure may be practiced with other computer system configurations, including hand-held devices, general purpose graphics processor-based systems, multiprocessor systems, microprocessor-based or programmable consumer electronics, application specific integrated circuit-based electronics, minicomputers, mainframe computers, and the like. Embodiments of the disclosure may also be practiced in distributed computing environments where tasks are performed by remote processing devices that are linked through a communications network. In a distributed computing environment, program modules may be located in both local and remote memory storage devices.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random-access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, solid state storage (e.g., USB drive), or a CD-ROM, a carrier wave from the Internet, or other forms of RAM or ROM. Further, the disclosed methods' stages may be modified in any manner, including by reordering stages and/or inserting or deleting stages, without departing from the disclosure.

Although the present disclosure has been explained in relation to its preferred embodiment, it is to be understood that many other possible modifications and variations can be made without departing from the spirit and scope of the disclosure.

What is claimed is:

1. A method for facilitating analysis of a model, the method comprising:
   receiving, using a communication device, at least one model data associated with at least one model from at least one user device, wherein the at least one model data comprises at least one source data associated with the at least one model, wherein the at least one model comprises at least one machine learning model, wherein the at least one source data is used to train the at least one machine learning model;
   analyzing, using a processing device, the at least one source data;
   identifying, using the processing device, at least one field from a plurality of fields associated with the at least one source data based on the analyzing of the at least one source data;
   retrieving, using a storage device, at least one field description associated with the at least one field based on the identifying of the at least one field;
   generating, using the processing device, at least one ontology of the at least one field based on the at least one field description using a natural language processing;
   identifying, using the processing device, at least one related field associated with the at least one field based on the at least one ontology;
   determining, using the processing device, at least one bias associated with the at least one machine learning model based on the at least one related field, wherein the at least one bias corresponds to an exclusion of the at least one related field from the plurality of fields;
   generating, using the processing device, at least one result based on the determining of the at least one bias, wherein the at least one result comprises the at least one bias;
   transmitting, using the communication device, the at least one result to the at least one user device; and
   storing, using the storage device, the at least one model data and the at least one machine learning model in a blockchain.

2. The method of claim 1 further comprising:
   identifying, using the processing device, at least one value present in the at least one source data associated with the at least one field based on the analyzing of the at least one source data and the identifying of the at least one field;
   retrieving, using the storage device, at least one related value based on the identifying of the at least one value;
   comparing, using the processing device, the at least one value with the at least one related value; and
   identifying, using the processing device, a match between the at least one value and the at least one related value based on the comparing, wherein the determining of the at least one bias is further based on the match between the at least one value and the at least one related value, wherein the at least one bias corresponds to an omission of the at least one related value from the at least one source data associated with the at least one field.

3. The method of claim 2 further comprising:
   transmitting, using the communication device, the at least one match to the at least one user device; and
   receiving, using the communication device, at least one confirmation on the match from the at least one user device, wherein the determining of the at least one bias based on the match is further based on the at least one confirmation.

4. The method of claim 1, wherein the at least one machine learning model generates at least one output based on at least one data selected to be used in the at least one machine learning model, wherein the at least one data comprises at least one value toassociated with the at least one field and the at least one corresponding to the at least one value, wherein the method further comprises:
   receiving, using the communication device, at least one value adjust data associated with the at least one value from the at least one user device;

modifying, using the processing device, the at least one value based on the at least one value adjust data;

generating, using the processing device, at least one modified value based on the modifying, wherein the at least one machine learning model generates at least one modified output based on the at least one modified value;

comparing, using the processing device, the at least one output and the at least one modified output;

identifying, using the processing device, an underrepresentation of the at least one field in the at least one machine learning model based on the comparing, wherein the determining of the at least one bias associated with the at least one machine learning model is further based on the identifying of the underrepresentation of the at least one field.

5. The method of claim 1 further comprising:

receiving, using the communication device, at least one model action associated with the at least one machine learning model from the at least one user device, wherein the at least one model action is associated with generating of the at least one machine learning model;

analyzing, using the processing device, the at least one model action;

generating, using the processing device, at least one artifact corresponding to the at least one model action based on the analyzing of the at least one model action, wherein the at least one artifact facilitates auditing of the at least one machine learning model; and storing, using the storage device, the at least one artifact in a blockchain.

6. The method of claim 5 further comprising:

analyzing, using the processing device, the at least one artifact;

determining, using the processing device, at least one risk associated with the at least one machine learning model based on the analyzing of the at least one artifact;

generating, using the processing device, at least one risk result based on the determining of the at least one risk, wherein the at least one risk result comprises the at least one risk; and transmitting, using the communication device, the at least one risk result to the at least one user device.

7. The method of claim 6, wherein the at least one risk is associated with at least one risk indicator, wherein the method further comprises:

flagging, using the processing device, the at least one machine learning model with the at least one risk indicator based on the determining of the at least one risk associated with the at least one machine learning model; and storing, using the storage device, the at least one risk indicator.

8. The method of claim 1 further comprising:

identifying, using the processing device, at least one missing value from the at least one source data for the at least one field and the at least one related field based on the analyzing of the at least one source data, the identifying of the at least one field, and the identifying of the at least one related field, wherein the determining of the at least one bias is further based on the at least one missing value and the at least one related value.

9. A system for facilitating analysis of a model, the system comprising:

a communication device;
a processing device;
a storage device;

the processing device being communicatively coupled with the communication device;

the storage device being communicatively coupled with the processing device;

the system being configured for:

receiving, using the communication device, at least one model data associated with at least one model from at least one user device, wherein the at least one model data comprises at least one source data associated with the at least one model, wherein the at least one model comprises at least one machine learning model, wherein the at least one source data is used to train the at least one machine learning model.

analyzing, using the processing device, the at least one source data;

identifying, using the processing device, at least one field from a plurality of fields associated with the at least one source data based on the analyzing of the at least one source data;

retrieving, using the storage device, at least one field description associated with the at least one field based on the identifying of the at least one field;

generating, using the processing device, at least one ontology of the at least one field based on the at least one field description using a natural language processing;

identifying, using the processing device, at least one related field associated with the at least one field based on the at least one ontology;

determining, using the processing device, at least one bias associated with the at least one machine learning model based on the at least one related field, wherein the at least one bias corresponds to an exclusion of the at least one related field from the plurality of fields;

generating, using the processing device, at least one result based on the determining of the at least one bias, wherein the at least one result comprises the at least one bias;

transmitting, using the communication device, the at least one result to the at least one user device; and storing, using a storage device, the at least one model data and the at least one machine learning model in a blockchain.

10. The system of claim 9, wherein the processing device is further configured for:

identifying at least one value associated with the at least one field present in the at least one source data based on the at least one source data and the identifying of the at least one field;

comparing the at least one value with at least one related value; and identifying a match between the at least one value and the at least one related value,value based on the comparing, wherein the storage device is further configured for retrieving the at least one related value based on the identifying of the at least one value, wherein the determining of the at least one bias is further based on the match between the at least one value and the at least one related value, wherein the at least one bias corresponds to an omission of the at least one related value from the at least one source data associated with the at least one field.

11. The system of claim 10, wherein the communication device is further configured for:
- transmitting the match to the at least one user device; and
- receiving at least one confirmation on the at least one match from the at least one user device, wherein the determining of the at least one bias based on the match is further based on the at least one confirmation.

12. The system of claim 9, wherein the at least one machine learning model generates at least one output based on the at least one data selected to be used in the at least one machine learning model, wherein the at least one data comprises at least one value corresponding to associated with the at least one field and the at least one output corresponding to the at least one value, wherein the communication device is further configured for:
- receiving at least one value adjust data associated with the at least one value from the at least one user device, wherein the processing device is further configured for:
- modifying the at least one value based on the at least one value adjust data;
- generating at least one modified value based on the modifying, wherein the at least one machine learning model generates at least one modified output based on the at least one modified value;
- comparing the at least one output and the at least one modified output; and
- identifying an underrepresentation of the at least one field in the at least one machine learning model based on the comparing, wherein the determining of the at least one bias associated with the at least one machine learning model is further based on the identifying of the underrepresentation of the at least one field.

13. The system of claim 9, wherein the communication device is further configured for receiving at least one model action associated with the at least one machine learning model from the at least one user device, wherein the at least one model action is associated with generating of the at least one machine learning model, wherein the processing device is further configured for;
- analyzing the at least one model action; and
- generating at least one artifact corresponding to the at least one model action based on the analyzing of the at least one model action, wherein the at least one artifact facilitates auditing of the at least one machine learning model, wherein the storage device is further configured for storing the at least one artifact in a blockchain.

14. The system of claim 13, wherein the processing device is further configured for:
- analyzing the at least one artifact;
- determining at least one risk associated with the at least one machine learning model based on the analyzing of the at least one artifact; and
- generating at least one risk result based on the determining of the at least one risk, wherein the at least one risk result comprises the at least one risk, wherein the communication device is further configured for transmitting the at least one risk result to the at least one user device.

15. The system of claim 14 wherein the at least one risk is associated with at least one risk indicator, wherein the processing device is further configured for flagging the at least one machine learning model with the at least one risk indicator based on the determining of the at least one risk associated with the at least one machine learning model, wherein the storage device is further configured for storing the at least one risk indicator.

16. The system of claim 9, wherein the processing device is further configured for:
- identifying at least one missing value from the at least one source data for the at least one field and the at least one related field based on the analyzing of the at least one source data, the identifying of the at least one field, and the identifying of the at least one related field, wherein the determining of the at least one bias is further based on the at least one missing value and the at least one related value.

* * * * *